(12) United States Patent
Takayanagi et al.

(10) Patent No.: US 7,311,167 B2
(45) Date of Patent: Dec. 25, 2007

(54) SWINGABLE VEHICLE

(75) Inventors: Shinji Takayanagi, Saitama (JP); Yohei Makata, Saitama (JP); Hiroyoshi Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 365 days.

(21) Appl. No.: 10/924,780

(22) Filed: Aug. 25, 2004

(65) Prior Publication Data
US 2005/0077098 A1  Apr. 14, 2005

(30) Foreign Application Priority Data

| Sep. 30, 2003 | (JP) | ............................. 2003-341725 |
| Sep. 30, 2003 | (JP) | ............................. 2003-342156 |
| Sep. 30, 2003 | (JP) | ............................. 2003-376282 |

(51) Int. Cl.
B62D 61/06 (2006.01)
B62D 23/00 (2006.01)
B62D 21/00 (2006.01)
B62K 5/02 (2006.01)

(52) U.S. Cl. ...................... 180/215; 180/312; 180/210; 180/384; 280/124.109; 280/124.134; 280/781

(58) Field of Classification Search ................ 180/215, 180/311, 312, 376, 385, 906, 210, 348, 384; 280/124.109, 124.134, 781; 464/167, 905, 464/906; 74/496
See application file for complete search history.

(56) References Cited

U.S. PATENT DOCUMENTS

| 3,476,200 | A |  | 11/1969 | Schoepe et al. |
| 3,709,314 | A |  | 1/1973 | Hickey |
| 4,650,210 | A | * | 3/1987 | Hirose et al. ................ 280/798 |
| 4,786,075 | A |  | 11/1988 | Takahashi |
| 5,611,733 | A | * | 3/1997 | Jacob et al. ................ 464/140 |
| 6,217,456 | B1 | * | 4/2001 | Jacob ......................... 464/167 |
| 6,254,487 | B1 | * | 7/2001 | Jacob ......................... 464/167 |

(Continued)

FOREIGN PATENT DOCUMENTS

EP  1 413 083 A  6/2004

(Continued)

Primary Examiner—Paul N. Dickson
Assistant Examiner—Joselynn Y. Sliteris
(74) Attorney, Agent, or Firm—Birch, Stewart, Kolasch & Birch, LLP

(57) ABSTRACT

A left drive shaft and a right drive shaft each include an inside constant velocity joint and an outside constant velocity joint with a ball spline mechanism provided between the inside constant velocity joint and the outside constant velocity joint for enabling the distance between the inside constant velocity joint and the outside constant velocity joint to be contracted and extended. The ball spline mechanism includes a spline shaft having an outer circumferential surface provided with a plurality of axial grooves extending in the axial direction, a tubular portion surrounding the periphery of the spline shaft and having an inner circumferential surface provided with a plurality of axial grooves extending in the axial direction and a plurality of balls capable of rolling while being fitted in the axial grooves and in the axial grooves. In addition, a left lower arm and a right lower arm are formed into an A-shape and are supported by a lower part of a rising portion and a lower end of the downwardly extending portion via a lower supporting shaft.

16 Claims, 19 Drawing Sheets

U.S. PATENT DOCUMENTS

| | | | |
|---|---|---|---|
| 6,276,480 B1 * | 8/2001 | Aregger | 180/213 |
| 6,364,778 B1 * | 4/2002 | Beitzel et al. | 464/168 |
| 6,470,991 B1 | 10/2002 | Bowman et al. | |
| 6,827,361 B2 * | 12/2004 | Seki | 280/124.134 |
| 7,063,179 B2 * | 6/2006 | Takayanagi et al. | 180/210 |
| 7,172,045 B2 * | 2/2007 | Takayanagi et al. | 180/210 |
| 7,204,333 B2 * | 4/2007 | Kuroki et al. | 180/210 |
| 7,207,408 B2 * | 4/2007 | Kuroki et al. | 180/210 |
| 2001/0048207 A1 * | 12/2001 | Handa | 280/124.135 |

FOREIGN PATENT DOCUMENTS

| | | |
|---|---|---|
| JP | 61-125973 A | 6/1986 |
| JP | 63-43905 U | 3/1988 |
| JP | 2521705 Y2 | 10/1996 |

* cited by examiner

SWINGABLE VEHICLE

CROSS-REFERENCE TO RELATED APPLICATIONS

The present application is related to Japanese Patent Application Nos. 2003-341725; 2003-342156 and 2003-376282 all filed on Sep. 30, 2003 the entire contents of which are hereby incorporated by reference.

BACKGROUND OF THE INVENTION

1. Field of the Invention

The present invention relates to a swingable vehicle.

2. Description of Background Art

Hitherto, a swingable vehicle is known wherein a slide type triport joint is used at one end of a drive shaft for being connected between a final speed reduction gear and a wheel. See, Japanese Utility Model Laid-open No. Sho 63-43905.

FIG. 1 of Japanese Utility Model Laid-open No. Sho 63-43905 will be described referring to FIG. 15 of the present specification. However, the reference numeral have been changed.

FIG. 15 is a side view of a drive shaft for a swingable vehicle according to the prior art, wherein a slide type triport joint 404 is used on the wheel 402 side of a drive shaft 403 for connection between a final speed reduction gear 401 and a wheel 402. A fixed type Birfield joint 405 is provided on the final speed reduction gear 401 side of the drive shaft 403.

The slide type triport joint 404 is a constant velocity joint in which the inner circumferential surface of a sleeve 407 is formed as one body with a spindle 406 being provided with three axial-direction grooves 408. Three radial-direction leg portions 411 are provided at an end portion of the drive shaft 403 and are axially movably engaged with the axial-direction grooves 408.

In the slide type triport joint 404, since the engagement portion between the axial-direction grooves 408 and the radial-direction leg portions 411 is located at a deep position of the inner circumferential surface, the bend angle of the slide type triport joint 404, i.e., the angle between the axis of the spindle 406 and the axis of the drive shaft 403 cannot be made large. In order to secure a vertical stroke of the wheel 402, it is necessary to secure the overall length of the drive shaft 403. Therefore, even in the case of a small vehicle where it is desirable to reduce the vehicle width, a reduction in the vehicle width is limited due to the need to secure the vertical stroke.

In addition, the limitation as to the bend angle of the slide type triport joint 404 causes limitations as to the freedom in design, such as specifications, size and layout, of the suspension in the vehicle. In addition, in the case of using the slide type triport joint 404 for a swingable vehicle, for example, the bend angle may limit the swing angle.

Furthermore, in the slide type triport joint 404, the processing of the axial-direction grooves 408 in the sleeve 407 and the formation of the radial-direction leg portions 411 on the drive shaft 403 involves difficulties. Therefore, the slide type triport joint 404 is higher in cost than the above-mentioned fixed type Birfield joint 405, for example.

A vehicle frame structure is also known in the related art wherein a rear wheel is attached via swing arms as disclosed in Japanese Utility Model Registration No. 2521705.

FIG. 1 in Japanese Utility Model Registration No. 2521705 will be described below in conjunction with FIG. 16 of the present specification. In addition, and FIG. 3 in Japanese Utility Model Registration No. 2521705 will be described below in conjunction with FIG. 17 of the present specification. In FIG. 16, only the rear half of the vehicle is shown. Reference numerals have been renumbered.

FIG. 16 is a side view showing a vehicle flame structure in the related art. A seat mounting frame 1402 and an engine supporting frame 1403 are mounted on top of the rear portion of a main frame 1401 of a sitting-type four-wheel buggy. An inclined frame 1404 is attached so as to bridge between the rear end of the main frame 1401 and the engine supporting frame 1403. A rear frame 1406 of an L-shape in side view is attached to the rear end of the engine supporting frame 1403 and a lower frame 1407 is attached so as to bridge between the end of the rear frame 1406 and the main frame 1401.

An engine 1408 is provided together with a transmission 1411 that is connected to the rear portion of the engine 1408. A differential gear 1412 is connected to the rear portion of the transmission 1411 and the differential gear 1412 is attached to the rear frame 1406.

FIG. 17 is a plan view of a principal portion showing the vehicle frame structure in the related art. Rear swing arms 1416 are attached to the lower frame 1407 via brackets 1414, 1414 with an axle pipe 1417 integrally attached to the rear swing arms 1416. An output shaft 1418 extends from the differential gear 1412 and is rotatably supported by the axle pipe 1417. A rear wheel 1421 is attached to the extremity of the output shaft 1418.

In FIGS. 16 and 17 the lower frame 1407 limits ground clearance and limits the downsizing of the frame when it is applied to a small vehicle.

Further, a swingable vehicle is known wherein one drive gear is suspended from a vehicle and the left and right wheels are inclined in conjunction with each other. See, for example, FIGS. 10 and 11 of Japanese Patent Laid-Open No. Sho 61-125973.

As another swingable vehicle, there has been known a three-wheel vehicle in which two rear wheels are respectively supported by rear forks. See, for example, FIGS. 1 and 9 of Japanese Patent Laid-Open No. Sho 61-125973.

The swingable vehicle disclosed in FIGS. 10 and 11 of Japanese Patent Laid-Open No. Sho 61-125973 is a vehicle in which the left and right wheels are moved in conjunction with each other. However, in the case where the vehicle speed is raised or where the condition of the road surface varies greatly, it is desirable that the left and right wheels be suspended independently.

On the other hand, FIG. 1 of Japanese Patent Laid-Open No. Sho 61-125973 discloses a swingable vehicle of an independent suspension type in which the left and right wheels are supported by the rear forks.

FIG. 1 and 7 of Japanese Patent Laid-Open No. Sho 61-125973 will be described referring to FIGS. 20(a) and 20(b) below. In addition, the condition where the three-wheel vehicle is inclined will be described referring to FIG. 20(c). The plan view in FIG. 1 of Japanese Patent Laid-Open No. Sho 61-125973 is omitted. In addition, the reference numerals have been changed.

FIGS. 20 (a) to (c) illustrate a conventional swingable vehicle, wherein FIG. 20(a) is a side view of a three-wheel vehicle as the swingable vehicle, showing the condition where a left-right pair of rear forks 1502 and 1503 are vertically swingably mounted to a differential device 1501 provided at a lower portion of the three-wheel vehicle. Rear wheels 1504 and 1505 are rotatably mounted to rear end portions of the rear forks 1502 and 1503. In addition, chains 1506 and 1507 are provided for transmitting power from the differential device 1501 to the rear wheels 1504 and 1505.

FIG. 20(*b*) shows the condition where of the rear wheels 1504 and 1505 is positioned on a projecting portion of the road surface. T1 in the FIG. 20(*b*) denotes the tread between the rear wheels 1504 and 1505.

FIG. 20(*c*) shows the condition of the rear wheels 1504 and 1505 when the three-wheel vehicle is swung. In this case, while the distance between the rear wheels 1504 and 1505 is T1, the distance between the respective grounding points of the rear wheels 1504 and 1505 is T2, and T2>T1. Namely, the tread between the rear wheels 1504 and 1505 is substantially broadened. Moreover, the distance T2 varies depending on the leftward or rightward swing angle of the three-wheel vehicle. As a result, the turning performance varies during turning.

In addition, in the conventional swingable vehicle of the left and right independent suspension type, and in FIG. 20(*a*), the chains 1506 and 1507 need maintenance such as length adjustment and replacement. Further, the wild ground operating performance of the three-wheel vehicle is enhanced if the vertical stroke amounts of the rear wheels 1504 and 1505 can be enlarged.

SUMMARY AND OBJECTS OF THE INVENTION

It is an object of the present invention to enlarge the bend angles of constant velocity joints, to make it possible to reduce the overall length of drive shafts and thereby reduce the vehicle width. Thus, an increase in the freedom in designing the suspension and the swing angle for a swingable vehicle is obtained.

The present invention provides a three-wheel or four-wheel swingable vehicle including wheels driven through drive shafts wherein each of the drive shafts includes a pair of constant velocity joints and a ball spline mechanism is provided between the constant velocity joints for enabling the distance between the constant velocity joints to be contracted and extended. The ball spline mechanism includes a spline shaft having an outer circumferential surface provided with a plurality of shaft-side spline grooves extending in the axial direction, an outer tube surrounding the periphery of the spline shaft and having an inner circumferential surface provided with a plurality of tube-side spline grooves extending in the axial direction and a plurality of balls capable of rolling while being fitted in the shaft-side spline grooves and the tube-side spline grooves.

Since the distance between the pair of constant velocity joints can be contracted and extended by the ball spline mechanism, it is unnecessary to provide the constant velocity joints with a slide mechanism.

The present invention provides drive shafts that are mounted to a swingable three-wheel vehicle in which a vehicle body frame is swung in the left-right direction relative to a double wishbone type suspension for supporting the rear wheels as the wheels.

When the bend angles of the drive shafts are set to be large, it is possible to reduce the tread between the left and right rear wheels and to reduce the vehicle width of the swingable three-wheel vehicle, while securing vertical strokes and swing angles in the left-right direction of the rear wheels of the swingable three-wheel vehicle.

The present invention provides a swingable three-wheel vehicle wherein the vehicle includes an engine that is rubber mounted on the vehicle body frame.

With the engine rubber mounted on the vehicle body frame, vibrations are prevented from being transmitted from the engine to the vehicle body frame. Thus, when the engine is displaced, the displacement is absorbed by the drive shafts.

The present invention provides a drive system case that is swung in the left-right direction together with the vehicle body frame.

The drive system case is swung in the left-right direction together with the vehicle body frame, whereby turning performance is enhanced.

According to the present invention, the ball spline mechanism is interposed between the pair of constant velocity joints of the drive shaft, so that the bend angle of the constant velocity joints can be set larger, as compared with the case where the constant velocity joints of the drive shaft are provided with a slide mechanism. Therefore, it is possible to reduce the overall length of the drive shafts while securing the vertical strokes of the wheels, to reduce the tread between the wheels and thereby to reduce the vehicle width, whereby a reduction in the size of the vehicle can be achieved. In addition, the slide mechanism is more favorable, since it is used for a swingable vehicle in which the bend angle increases depending on the swing angle.

In addition, since the bend angle of the constant velocity joints is large, it is possible to increase the freedom in designing, such as the specifications, size, layout and swing angle of the suspension.

Furthermore, when the pair of constant velocity joints are the same with each other and a commercially available ball spline mechanism is utilized, a rise in the cost of the drive shafts can be suppressed.

According to the present invention, the drive shafts are mounted to a swingable three-wheel vehicle in which the vehicle body frame is swung in the left-right direction relative to the double wishbone type suspension for supporting the rear wheels as wheels. Since the bend angles of the drive shafts can be enlarged, it is possible to shorten the overall length of the drive shafts, and therefore to reduce the tread between the left and right rear wheels, while securing the vertical strokes of the rear wheels of the swingable three-wheel vehicle. Accordingly, with the above-mentioned drive shafts applied to a small-type swingable three-wheel vehicle, it is possible to reduce the vehicle width, and to achieve a reduction in the size of the swingable three-wheel vehicle.

In addition, with the combination of the double wishbone type suspension, a high degree of freedom in designing the above-mentioned drive shafts, is possible to further enhance the ride comfort and operating performance of the vehicle.

According to the present invention, the swingable three-wheel vehicle is a vehicle in which the engine is rubber mounted on the vehicle body frame. Thus, vibrations can be prevented from being transmitted from the engine to the vehicle body frame, and displacements of the engine can be absorbed by the drive shafts.

According to the present invention, the drive system case is swung in the left-right direction together with the vehicle body frame, so that the turning performance of the swingable vehicle can be enhanced.

Another object of the present invention is to downsize a frame without being limited in ground clearance by a rear frame in a vehicle frame structure.

The present invention provides a vehicle such as a three-wheel vehicle or a four-wheel vehicle in which left and right suspension arms are attached to the rear portion of a vehicle body frame so as to be capable of swinging in the vertical direction. Driving wheels are connected via a drive shaft from the engine side and are rotatably mounted to the distal sides of the suspension arms. An under frame includes the lower portion of the vehicle body frame having a rising portion inclining upwardly toward the rear in front of the drive shaft. A fore-and-aft extending portion extends substantially in the fore-and-aft direction above the drive shaft with a downwardly extending portion extending downwardly behind the drive shaft. The suspension arms formed into an A-shape are supported by the lower part of the rising portion and the lower end of the downwardly extending portion via a supporting shaft.

When one of the two mounting portions of the A-shaped suspensions is disposed in the vicinity of the lower part of the rising portion of the under frame and the other one of the mounting portions of the A-shaped suspensions is disposed in the vicinity of the lower end of the downward extending portion of the under frame, a distance between two mounting portions increases.

The present invention includes the rising portion, the fore-and-aft extending portion and the downwardly extending portion that are formed into a single frame with the left and right suspension arms are supported via a single supporting shaft.

The left and right suspension arms are supported via the single supporting shaft and the driving wheels are attached to the extremities of the left and right suspension arms. Accordingly a tread between driving wheels decreases.

In the present invention, since the suspension arms formed into an A-shape are supported by the lower part of the rising portion and the lower end of the downwardly extending portion via the supporting shaft, the distance between front and rear two mounting portions with respect to the supporting shaft of the A-shaped suspension arms may be increased, the frame may be downsized, and the ground clearance is not limited by the rear frame.

In the present invention, since the left and right suspension arms are supported via the single supporting shaft, for example, in comparison with the case in which the suspensions are mounted separately to the left and right of the vehicle body frame, the tread between the left and right driving wheels may be reduced. Thus, the width of the vehicle may be reduced in the present invention. Also, since the left and right suspension arms are supported via the single supporting shaft, even when the width of the vehicle is small, for example, a double wishbone type suspension having an upper arm and a lower arm provided respectively on the left and right thereof may be employed as suspension arms. Thus, the ride quality may be improved even with the small vehicle.

Furthermore, the frame for supporting the suspension arms is composed of a single frame, the structure of the vehicle body frame is simplified, and hence the frame may be downsized.

It is another object of the present invention to eliminate variations in the tread of drive wheels at the time of swinging, to achieve a higher maintainability and to enhance the uneven ground operational performance, in a swingable vehicle.

The present invention resides in a swingable vehicle in the form of a three-wheel vehicle, a four-wheel vehicle or the like including left and right suspension arms mounted to a vehicle body frame with the vehicle body frame being swingable in the left-right direction relative to the suspension arms. The suspension arms are provided at left and right positions and at upper end lower positions to constitute a double wishbone type suspension, left and right drive wheels are supported by the double wishbone type suspension and the drive wheels are connected to the drive source side through drive shafts extending in the front-rear direction.

With the left and right drive wheels supported by the double wishbone type suspension, variations in the tread between the left and right drive wheels are reduced while the left and right wheels are independently suspended.

In addition, the drive shafts extend in the front-rear direction from the drive source side to the drive wheels, and the overall lengths of the drive shafts are enlarged while securing bend angles of joint portions of the drive shafts. Further, a higher maintainability is contrived by use of the drive shafts.

The present invention provides left and right suspension arms that are swingably mounted to one upper support shaft and one lower support shaft which are respectively provided at central portions of the vehicle body.

The left and right suspension arms are respectively mounted to one upper shaft and one lower shaft, whereby the tread between the left and right drive wheels is reduced.

In the present invention, the double wishbone type suspension is provided, whereby it is possible to reduce variations in the tread while suspending the left and right drive wheels independently, and to enhance operability and safety of the swingable vehicle. In addition, with the drive shafts extending in the front-rear direction from the drive source side to the drive wheels, it is possible to enlarge the overall lengths of the drive shafts while securing bending angles of joint portions of the drive shafts without enlarging the tread of the drive wheels, to enlarge the vertical strokes of the drive wheels and to enhance the uneven ground operational performance of the vehicle. Further, since the drive shafts are used, there is no need for adjustment, replacement or the like, and it is possible to enhance maintainability.

In the present invention, the left and right suspension arms are respectively mounted to one upper shaft and one lower shaft, whereby it is possible to reduce the tread and reduce the vehicle width, while securing vertical strokes of the left and right drive wheels, as compared, for example, with the structure in which the left and the right suspension arms are respectively mounted to different shafts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The best mode for carrying out the present invention will be described below, based on the accompanying drawings.

Figure 1:
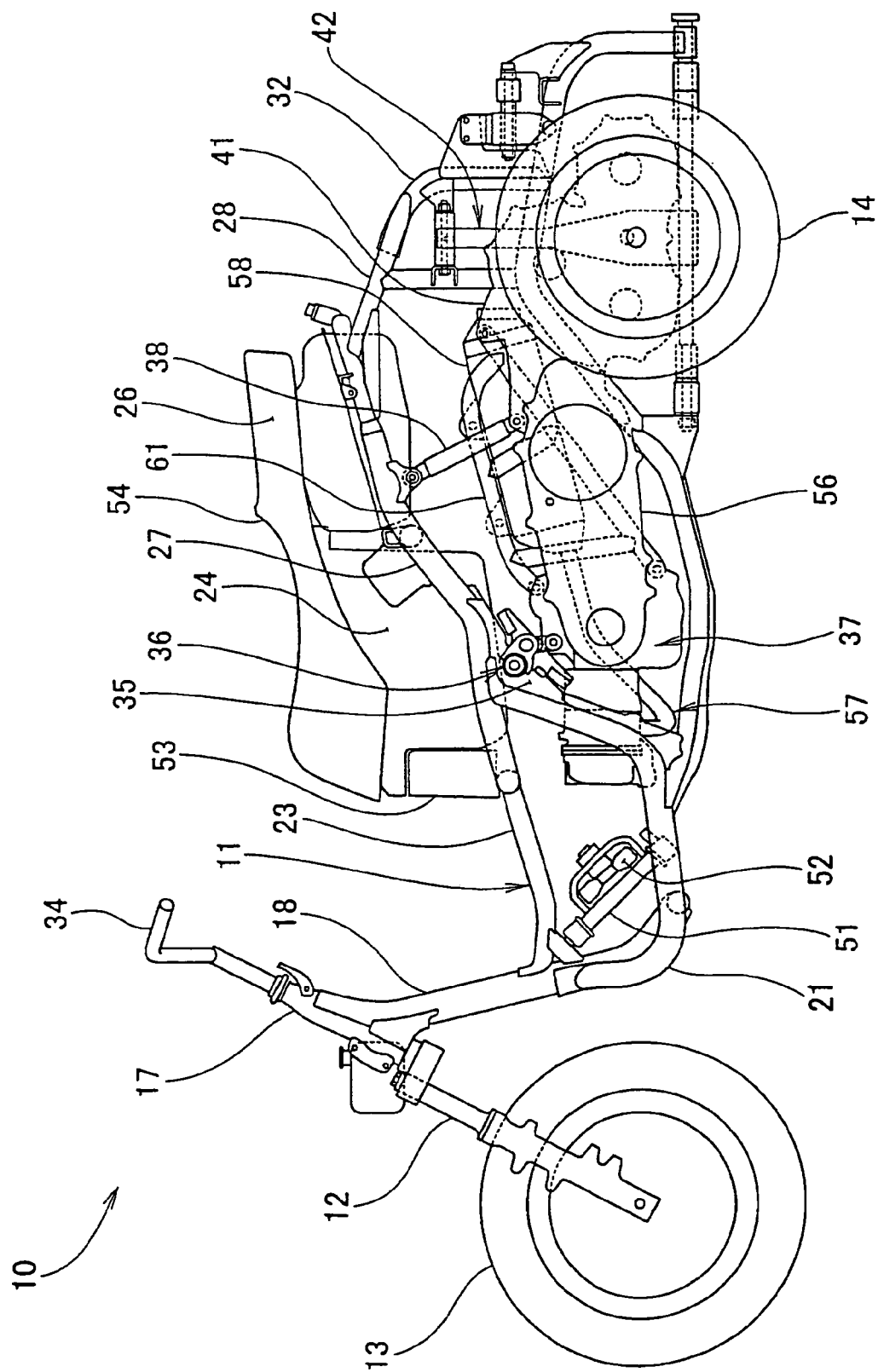
FIG. 1 is a side view of the swingable vehicle according to the present invention.

FIG. 1 is a side view of a swingable vehicle according to the present invention. The swingable vehicle 10 is a swingable three-wheel vehicle in which a front wheel 13 is mounted to a front portion of a vehicle body frame 11 through a front fork 12. Rear wheels 14 and 15 (only symbol 14 on the viewer's side is shown) as left and right wheels are mounted to rear portions of the vehicle body frame 11 through left and right suspension arms (described in detail later). The vehicle frame 11 is swingable in the left-right direction relative to the suspension arms at the time of turning, for example.

The vehicle body frame 11 includes a head pipe 17 provided at the front end, a down pipe 18 extending substantially downwardly from the head pipe 17, lower pipes 21 and 22 (only symbol 21 on the viewer's side is shown) extending in roughly a U-shape in side view to the left and right sides from an intermediate portion of the down pipe 18 with a center pipe 23 extending rearwardly from an intermediate portion of the down pipe 18. A center support frame 27 is connected to the rear ends of the lower pipes 21 and 22 and the rear end of the center pipe 23 for supporting a luggage box 24 and a fuel tank 26. Left and right rear upper pipes 28 and 31 (only symbol 28 on the viewer's side is shown) are connected to rear end portions of the center support frame 27. A rear down pipe 32 is connected to the rear upper pipes 28 and 31.

The swingable vehicle 10 has a structure in which the front fork 12 is steerably mounted to the head pipe 17 through a steering shaft (not shown) with the front wheel 13 being rotatably mounted to the lower ends of the front fork 12 and a steering handle 34 being mounted to an upper portion of the steering shaft. Reinforcement plates 35 are attached to joint portions between the lower pipes 21 and 22 and the center support frame 27. An engine 37 is mounted to the reinforcement plates 35, 35 (only symbol 35 on the viewer's side is shown) through a rubber mount device 36 with a gear box 41 being mounted to an intermediate portion in the front-rear direction of the center support frame 27 through a rubber mount rod 38. The left and right rear wheels 14 and 15 are mounted to rear portions of the vehicle body frame 11 through a double wishbone type suspension 42.

A rear portion of the engine 37 is mounted to an intermediate portion in the front-rear direction of the center support frame 27 through a rubber mount rod 38. A left drive shaft 143 and a right drive shaft 144 (not shown) extend rearwardly from a rear lower portion of the engine 37 with the respective rear ends of the left drive shaft 143 and the right drive shaft 144 being connected to rear gear boxes 335 and 336 (only symbol 335 on the viewer's side is shown). The left and right rear wheels 14 and 15 are mounted to rear portions of the vehicle body frame 11 through a double wishbone type suspension 42.

A radiator 51 is provided together with a radiator fan 52, a battery 53, and a seat 54. A stepless speed change transmission 56 is provided between the engine 37 and the gear box 41. An exhaust pipe 57 extends rearwardly from the engine 37 with a muffler 58 being connected to the rear end of the exhaust pipe 57. A reinforcement frame 61 connects the engine 37 and the gear box 41 to each other and for mounting a muffler 58 thereto.

Figure 2:
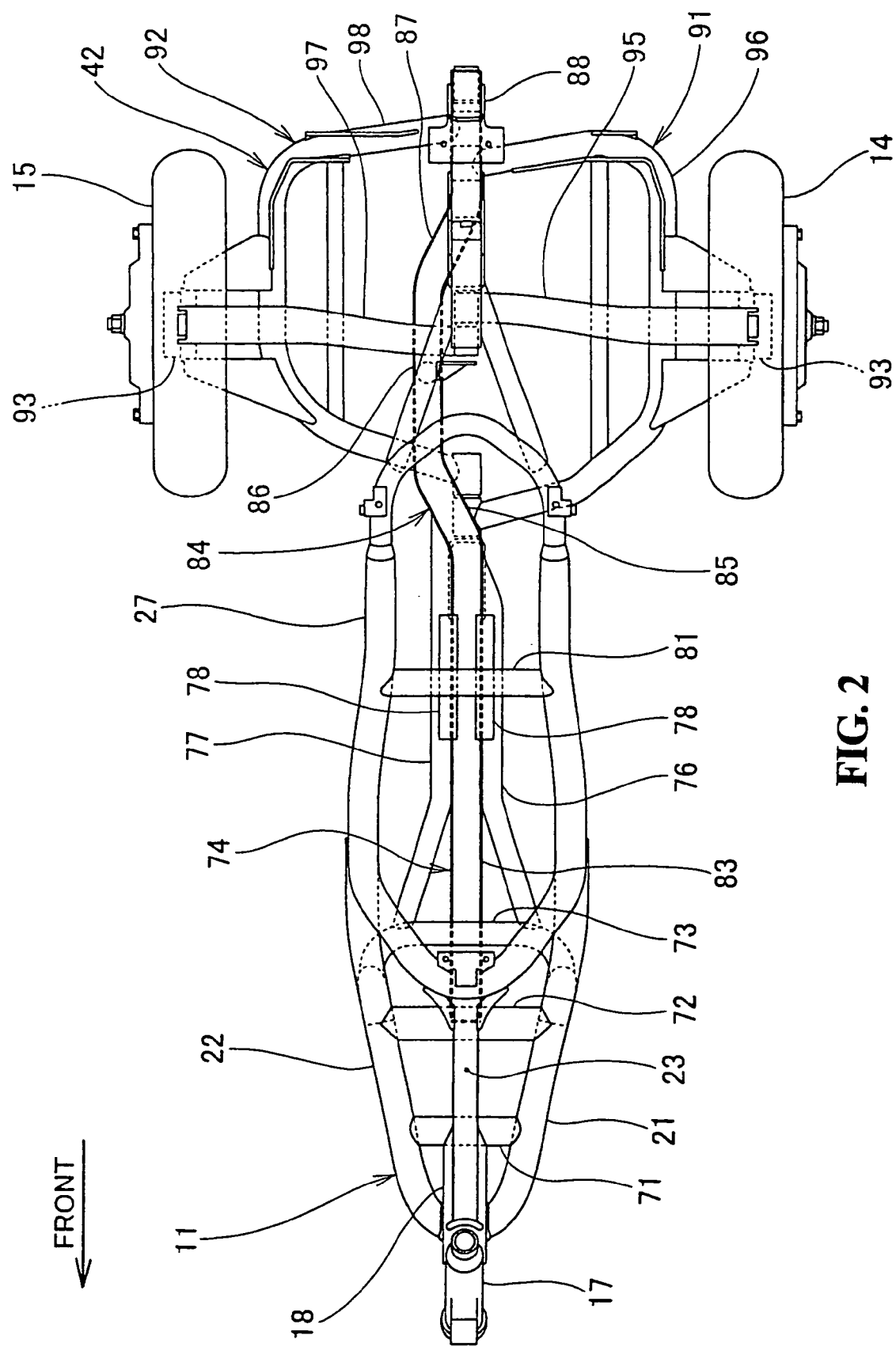
FIG. 2 is a plan view of a vehicle body frame and a rear wheel suspension in the swingable vehicle according to the present invention.

FIG. 2 is a plan view showing the vehicle body frame and a rear wheel suspension in the swingable vehicle according to the present invention. In FIG. 2, arrow FRONT indicates the front side of the vehicle (this applies here and hereinbelow).

The vehicle body frame 11 includes a first cross pipe 71, a second cross pipe 72 and an under cross pipe 73 for connecting the left and right lower pipes 21 and 22. An under frame 74 (the member indicated by bold line) extends rearwardly from a central portion of the second cross pipe 72 with left and right under side pipes 76 and 77 each having its front end connected to the under cross pipe 73 and its rear end mounted along the under frame 74. Reinforcement plates 78 are bridgingly disposed between the under frame 74 and the under side pipes 76 and 77 with an upper cross pipe 81 bridgingly disposed in the width direction on the center support frame 27 formed in a loop shape.

The under frame 74 is composed of a rectilinear portion constituting a front half portion and a bent portion 84 constituting a rear half portion. The bent portion 84 is composed of a front bent portion 85, a front rectilinear portion 86, a rear bent portion 87 and a rear rectilinear portion 88, in this order from the front side toward the right side.

The double wishbone type suspension 42 includes a left-side suspension arm 91 and a right-side suspension arm 92 mounted to support shafts (not shown; described in detail later) extending in the front-rear direction at a lower portion of the vehicle body frame 11. Knuckles 93, 93 are attached to the respective tip ends of the left-side suspension arm 91 and the right-side suspension arm 92. Hubs (not shown) are rotatably mounted to the knuckles 93, 93 through bearings with the rear wheels 14 and 15 being attached to the left and right hubs.

The left-side suspension arm 91 is composed of a roughly rectilinear left upper arm 95 and an A-shaped left lower arm 96. Similarly, the right-side suspension arm 92 is composed of a roughly rectilinear right upper arm 97 and an A-shaped right lower arm 98.

Figure 3:
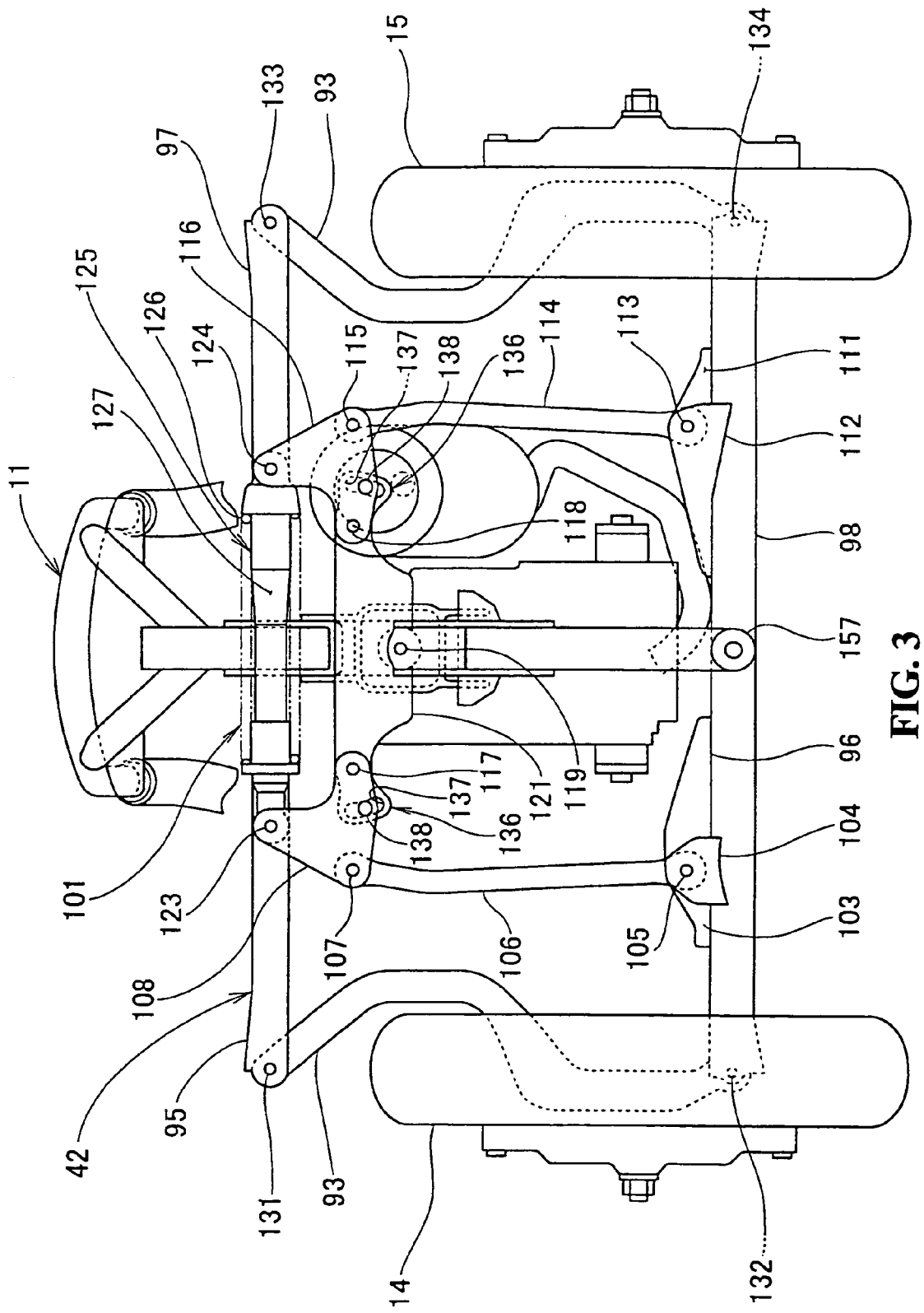
FIG. 3 is a back elevation of the swingable vehicle according to the present invention.

FIG. 3 is a back elevational view of the swingable vehicle according to the present invention, in which a shock absorbing mechanism 101 for preventing shocks from being transmitted from the rear wheels 14 and 15 to the vehicle body frame 11 is annexed to the double wishbone type suspension 42.

The shock absorbing mechanism 101 is composed of a roughly rectilinear left link 106 which is swingably mounted to left brackets 103 and 104 provided at upper portions of the left lower arm 96 through a support shaft 105 and which is extends upwardly. A left bell crank 108 is swingably connected to the upper end of the left link 106 through a support shaft 107 with a roughly rectilinear right link 114 which is swingably mounted to right brackets 111 and 112 provided at upper portions of the right lower arm 98 through a support shaft 113 and which extends upwardly. A right bell crank 116 is swingably mounted to the upper end of the right link 114 through a support shaft 115, a left-right connection member 121 is swingably mounted to a rear portion of the vehicle body frame 11 through a support shaft 119 for connecting the left bell crank 108 and the right bell crank 116 through a support shaft 119. A shock absorber 125 is bridgingly provided between a support shaft 123 provided at the left bell crank 108 and a support shaft 124 provided at the right bell crank 116.

The shock absorber 125 displays a shock-absorbing action when the rear wheels 14 and 15 are moved vertically. The shock absorber 125 is composed of a coil spring 126 for generating an elastic force and a damper 127 for generating an attenuating force.

A support shaft 131 is provided for connecting the left upper arm 95 and the knuckle 93. A support shaft 132 is provided for connecting the left lower arm 96 and the knuckle 93. A support shaft 133 is provided for connecting between the right upper arm 97 and the knuckle 93. A support shaft 134 is provided for connecting between the right lower arm 98 and the knuckle 93.

In the FIG. 3, a stroke limiting mechanism 136 is provided at the connection portion between the left and right bell cranks 108, 116 and the left-right connection member 121, for the purpose of restricting the vertical strokes of the rear wheels 14 and 15. The stroke limiting mechanism 136 is composed of arcuate slots 137 provided on both sides of the left-right connection member 121 with stopper pins 138 passed through the arcuate slots 137 and attached respectively to the left and right bell cranks 108 and 116.

Figure 4:
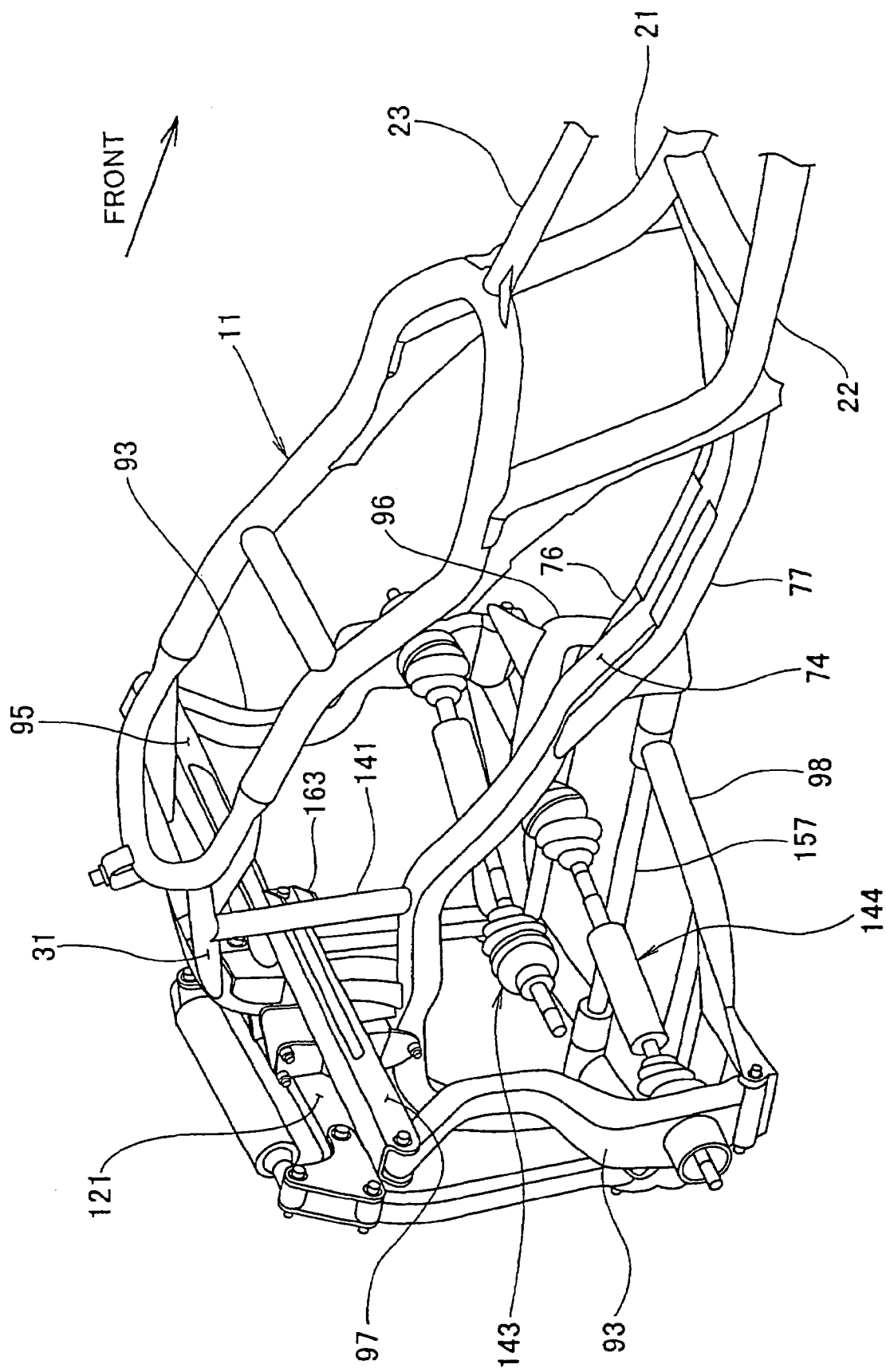
FIG. 4 is a perspective view of the vehicle body frame, the rear wheel suspension and drive shafts in the swingable vehicle according to the present invention.

FIG. 4 is a perspective view of the vehicle body frame, the rear wheel suspension and drive shafts in the swingable vehicle according to the present invention. A vertical pipe 141 is mounted in the state of bridging between the under frame 74 and the rear upper pipe 31 of the vehicle body frame 11. A left drive shaft 143 and a right drive shaft 144 are bridgingly disposed between the gear box 41 (see FIG. 1) and hubs (not shown) rotatably mounted to the knuckles 93.

Figure 5:
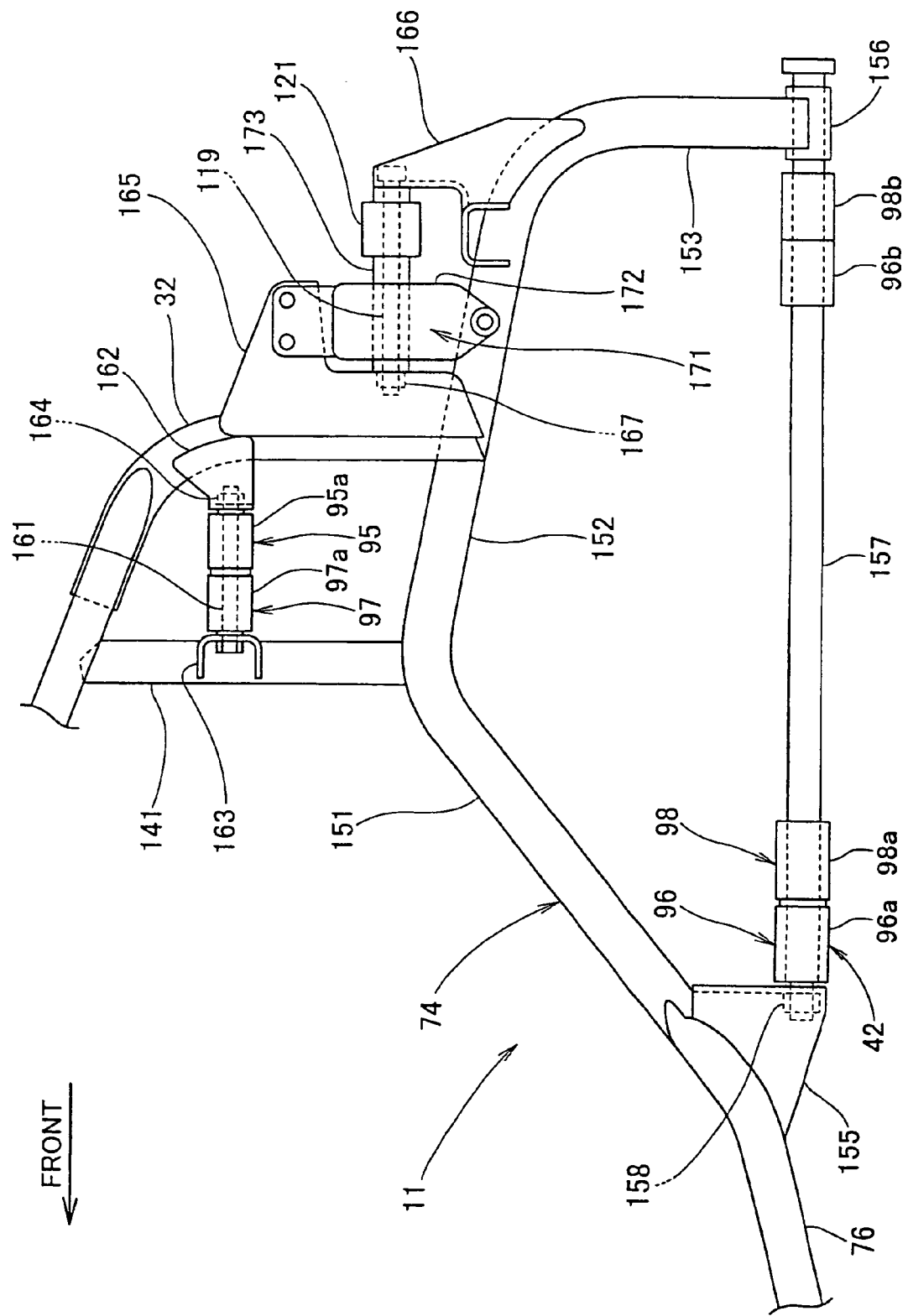
FIG. 5 is a side view of an essential part showing a rear portion of the vehicle body frame in the swingable vehicle according to the present invention.

FIG. 5 is a side view of an essential part showing a rear portion of the vehicle body frame of the swingable vehicle according to the present invention.

The under frame 74 includes a rising portion 151 inclined rearwardly and upwardly, a front-rear extended portion 152 extends roughly in the front-rear direction from the rear end of the rising portion 151 and a downwardly extending portion 153 is bent and extends downwardly from the rear end of the front-rear extended portion 152. A front support bracket 155 is attached to a lower portion of the rising portion 151 with a rear support tubular member 156 attached to a lower end portion of the downwardly extended portion 153. A lower support shaft 157 is attached to the front support bracket 155 and the rear support tubular member 156 and a part of the double wishbone type suspension 42 is mounted to the lower support shaft 157.

The left lower arm 96 and the right lower arm 98 are vertically swingably mounted to the lower support shaft 157. To be more specific, a front mount portion 96a and a rear mount portion 96b of the left lower arm 96 and a front mount portion 98a and a rear mount portion 98b of the right lower arm 98 are rotatably mounted to the lower support shaft 157.

The lower support shaft 157, after being passed through the rear support tubular member 156, is passed sequentially through the rear mount portion 98b, the rear mount portion 96b, the front mount portion 98a and the front mount portion 96a, and is screw-engaged into a nut 158 attached integrally to the front support bracket 155, whereby the lower support shaft 157 is mounted in position.

In addition, an upper support shaft 161 to which the left upper arm 95 and the right upper arm 97 of the double wishbone type suspension 42 are to be vertically swingably mounted is a bolt which is attached to an upper rear support bracket 162 attached to a front portion of the rear down pipe 32. An upper front support bracket 163 is attached to a side portion of the vertical pipe 141, is passed through a mount hole provided in the upper front support bracket 163 and is screw-engaged into a nut 164 attached integrally to the upper rear support bracket 162. A left mount portion 95a is provided in the left upper arm 95 for being rotatably mounting to the upper support shaft 161. A right mount portion 97a is provided in the right upper arm 97 for being rotatably mounting to the upper support shaft 161.

The support shaft 119 for supporting the left-right connection member 121 is a bolt which is mounted in the state of being bridgingly disposed between a rear first bracket 165 attached to the rear down pipe 32. The under frame 74 and a rear second bracket 166 is attached to respective connection portions of the front-rear extending portion 152 and the downwardly extending portion 153 of the under frame 74. The support shaft 119 is fixed by being screw-engaged into a nut 167 attached integrally to the rear first bracket 165 after being passed through a mount hole provided in the rear second bracket 166.

A Neidhart damper 171 is provided for generating an elastic force so as to return a swing to the original state when the under frame 74 is swung in the left-right direction relative to the left-right connection member 121. More specifically, when the vehicle body frame 11 is swung in the left-right direction relative to the left lower arm 96 and the right lower arm 98 which are connected to the left-right connection member 121 as shown in FIG. 3. The Neidhart damper is composed of a bisected case 172 attached to the rear first bracket 165 and the under frame 74, projecting members (not shown; provided inside the case 172) projecting in the radial direction from a collar member 173 attached integrally to the left-right connection member 121 and rotatably fitted over the support shaft 119. A plurality of cylindrical rubbers are interposed between recessed portions between the projected members and the case 172.

When the case 172 is inclined together with the vehicle body frame 11 relative to the projecting members, the cylindrical rubbers clamped between the projecting members and the case 172 are compressed, thereby generating such elastic forces as to render the vehicle body frame 11 upright.

Figure 6:
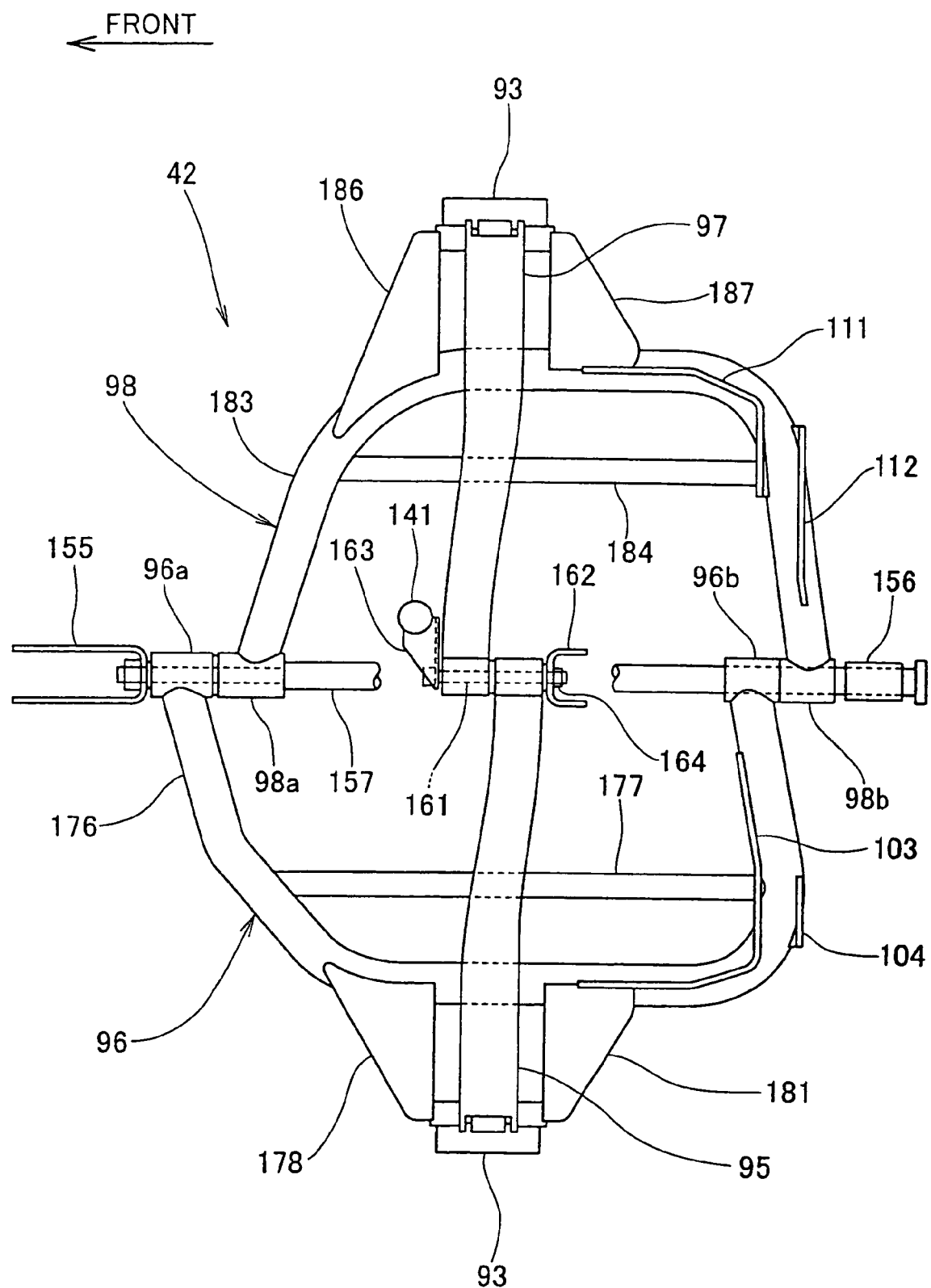
FIG. 6 is a plan view of the rear wheel suspension according to the present invention.

FIG. 6 is a plan view of the rear wheel suspension according to the present invention. The double wishbone type suspension has a structure in which the lower support shaft 157 is mounted to the front support bracket 155 and the rear support tubular member 156 with the left lower arm 96 and the right lower arm 98 being mounted to the lower support shaft 157. The upper support shaft 161 is mounted to the upper rear support bracket 162 and the upper front support bracket 163 with the left upper arm 95 and the right upper arm 97 being mounted to the upper support shaft 161. The knuckle 93 is mounted to the respective tip ends of the left upper arm 95 and the left lower arm 96 and the knuckle 93 is mounted to the respective tip ends of the right upper arm 97 and the right lower arm 98.

The left lower arm 96 is composed of an arm main body 176 in a roughly angular U-shaped in plan view with a front mount portion 96a and a rear mount portion 96b being provided at end portions for mounting the arm main body 176 to the lower support arm 157. A front-rear bar 177 is provided in the arm main body 176 along the front-rear direction with sideways extending plates 178 and 181 extending to lateral sides of the vehicle body from the arm main body 176 for mounting the knuckle 93 and the above-mentioned left brackets 103 and 104.

The right lower arm 98 is composed of an arm main body 183 in a roughly angular U-shaped in plan view with a front mount portion 98a and a rear mount portion 98b being provided at end portions for mounting the arm main body 183 to the lower support arm 157. A front-rear bar 184 is provided in the arm main body 183 along the front-rear direction with sideways extending plates 186 and 187 extending to lateral sides of the vehicle body from the arm main body 183 for mounting the knuckle 93 and the above-mentioned right brackets 111 and 112.

Figure 7:
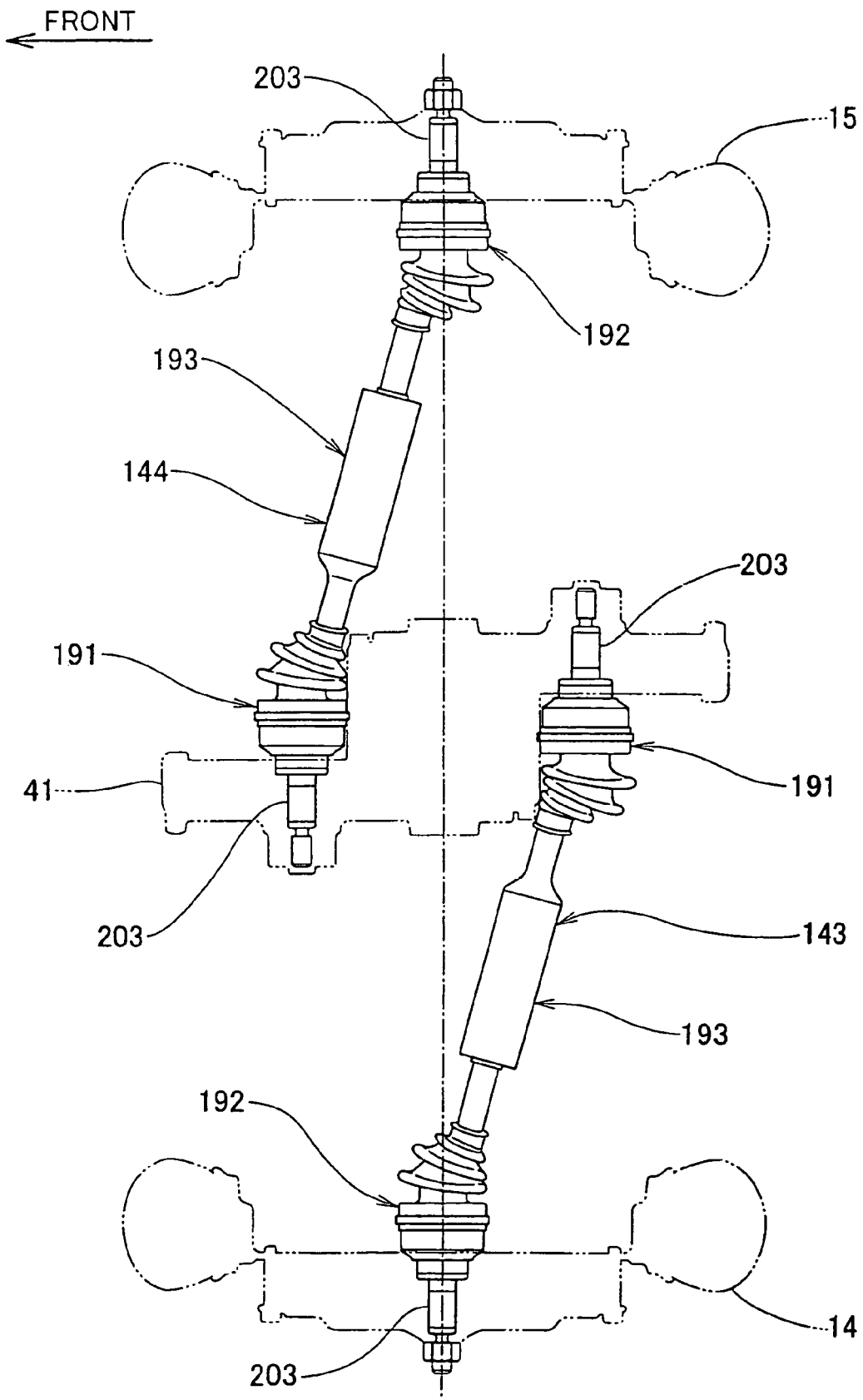
FIG. 7 is a plan view of drive shafts in the swingable vehicle according to the present invention.

FIG. 7 is a plan view of the drive shafts for a swingable vehicle according to the present invention, showing that the left drive shaft 143 extending with the left with a slightly forward inclination from a rear portion of the gear box 41 and is coupled to the hub on the side of the rear wheel 14. The right drive shaft 144 extends from the right with a slightly rearward inclination from a front portion of the gear box 41 and is coupled to the hub on the side of the rear wheel 15.

Figure 8A:
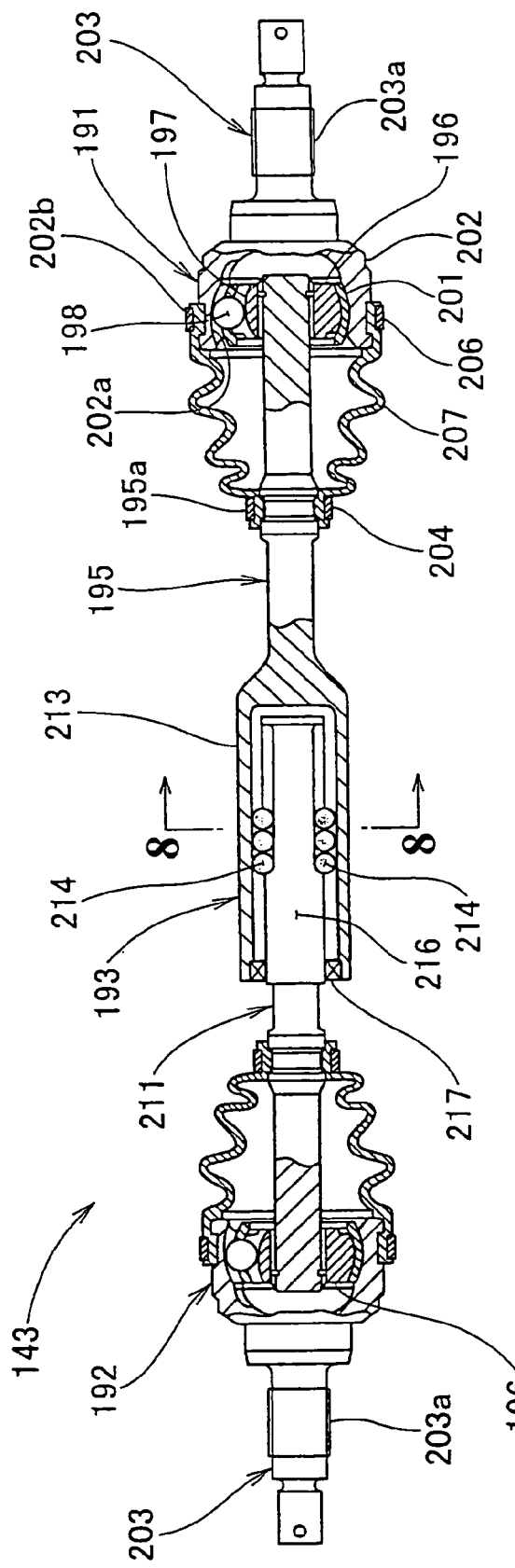
FIGS. 8(a) and 8(b) show sectional views of the left drive shaft in the swingable vehicle according to the present invention.
Figure 8B:
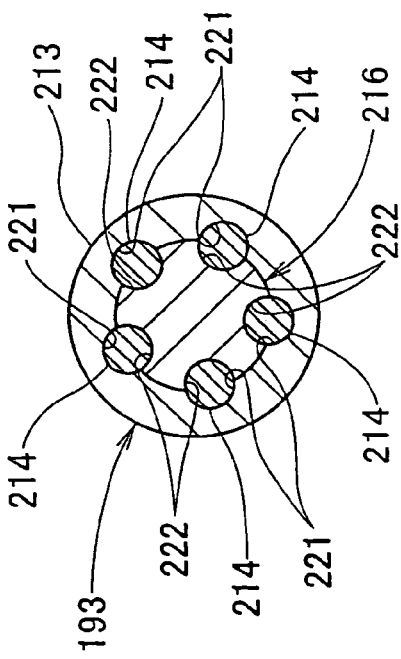

FIGS. 8(a) and 8(b) are sectional views of a left drive shaft in the swingable vehicle according to the present invention. Note that a right drive shaft is the same as the left drive shaft in structure. Therefore, a description of the right drive shaft is omitted.

In FIG. 8(a), the left drive shaft 143 is composed of an inside constant velocity joint 191 connected to the side of the gear box 41 (see FIG. 7) with an outside constant velocity joint 192 is connected to the side of the rear wheel 14 (see FIG. 7) and a ball spline mechanism 193 being interposed between the inside constant velocity joint 191 and the outside constant velocity joint 192.

The inside constant velocity joint 191 is composed of an inside shaft 195 constituting a part of the ball spline mechanism 193 with an inner ring 196 attached to the tip end of the inside shaft 195. Balls 198 are fitted in a plurality of arcuate outside surface grooves 197 provided in the outer circumferential surface of the inner ring 196 with each having a groove bottom curved in an arcuate shape in the axial direction. A cage 201 is slidably fitted over the inner ring 196 so as to position the balls 198 with an outer ring 202 fitted over the outside of the cage 201 and provided with a plurality of arcuate inside surface grooves 202a in which the balls 198 are fitted and which each have a groove bottom curved in an arcuate shape in the axial direction. A shaft portion 203 is formed as one body with the outer ring 202 and is provided with male splines 203a for spline coupling with gears in the gear box 41. A rubber boot 207 having one end fixed to an annular groove portion 195a is provided in the inside shaft 195 by a band 204 and includes the other end fixed to an annular groove portion 202b provided in the outer circumferential surface of the outer ring 202 by a band 206.

The outside constant velocity joint 192 is the same as the inside constant velocity joint 191 in fundamental structure and has a structure in which an inner ring 196 is mounted to an end portion of an outside shaft 211 constituting a part of the ball spline mechanism 193. A shaft portion 203 functions also as an axle for the rear wheel and male splines 203a are in spline engagement with the hub.

The ball spline mechanism 193 is composed of a tubular portion 213 as an outer tube formed as one body with one end portion of the inside shaft 195, a slide shaft 216 formed as one body with one end portion of the outside shaft 211 and being axially movably inserted in the tubular portion 213 through balls 214 . . . ( . . . means plurality, here and hereinafter), and a seal member 217 provided at an opening portion of the tubular portion 213 for sealing off the gap between the tubular portion 213 and the slide shaft 216.

FIG. 8(b) is a sectional view taken along line 8-8 of FIG. 8(a). The ball spline mechanism 193 has a structure in which the inside surface of the tubular portion 213 is provided with axial grooves 221 . . . in the axial direction for moving the balls 214 . . . and the outside surface of the slide shaft 216 is provided with axial grooves 222 . . . in the axial direction for moving the balls 214 . . . .

Thus, in FIGS. 8(a) and 8(b), the ball spline mechanism 193 permits the outside shaft 211 to slide in the axial direction relative to the inside shaft 195, without relative rotation.

Next, the functions of the swingable vehicle 10 will be described.

Figure 9:
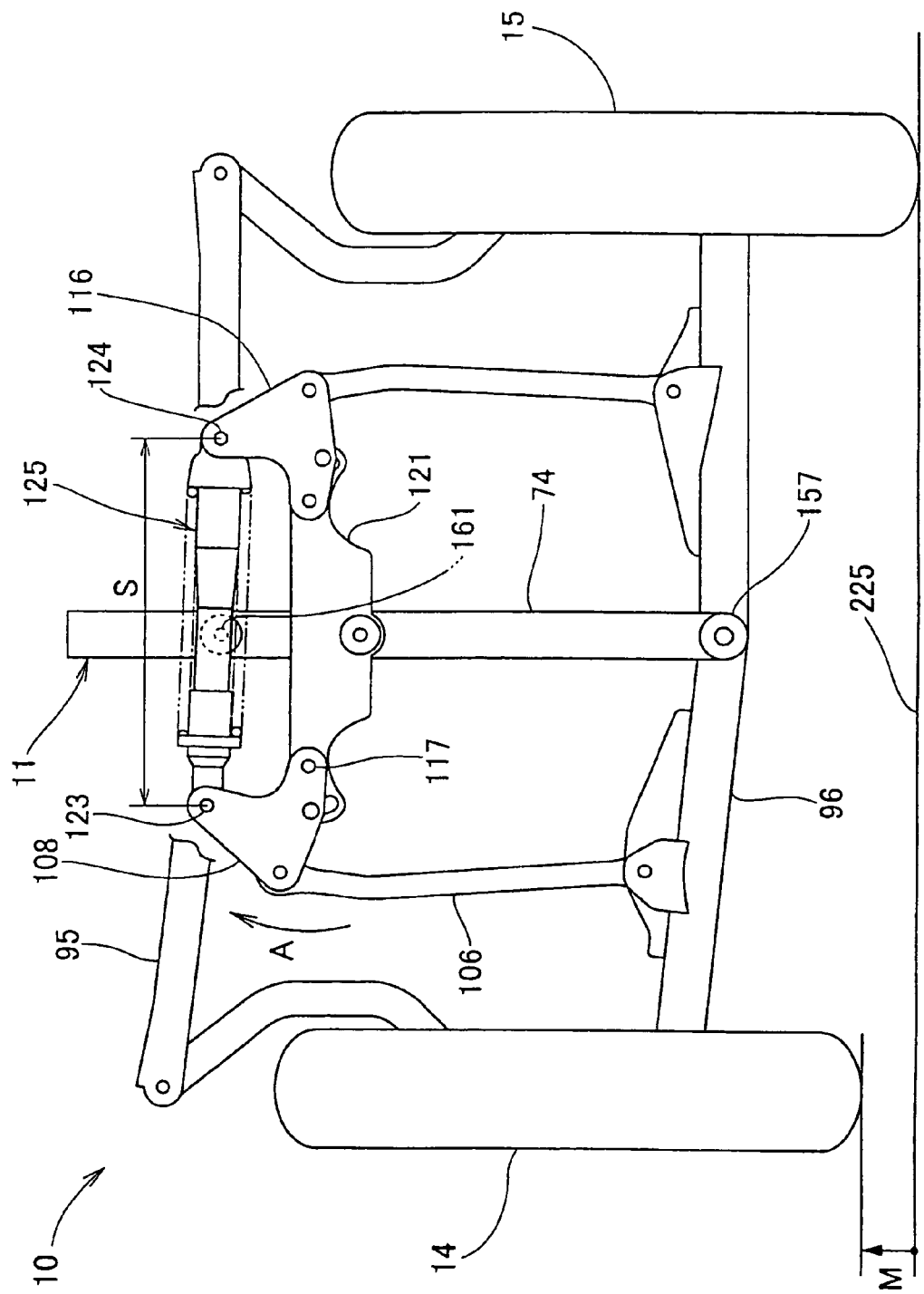
FIG. 9 is a first back elevation for showing a function of the swingable vehicle according to the present invention.

FIG. 9 is the first back elevation showing the function of the swingable vehicle according to the present invention.

For example, in the case where the leftside rear wheel 14 is raised by a moving amount M relative to the ground 225, both the left upper arm 95 and the left lower arm 96 are swung upwardly relative to the vehicle body frame 11, more specifically, relative to the under frame 74. In this instance, the left link 106 connected to the left lower arm 96 is raised, attended by clockwise rotation of the left bell crank 108 about the support shaft 117 as indicated by arrow A.

Since the right bell crank 116 on the side of the rear wheel 15 remains stationary, the interval between the support shaft 123 of the left bell crank 108 and the support shaft 124 of the right bell crank 116 is reduced, so that the shock absorber 125 absorbs the shock while being contracted.

Figure 10:
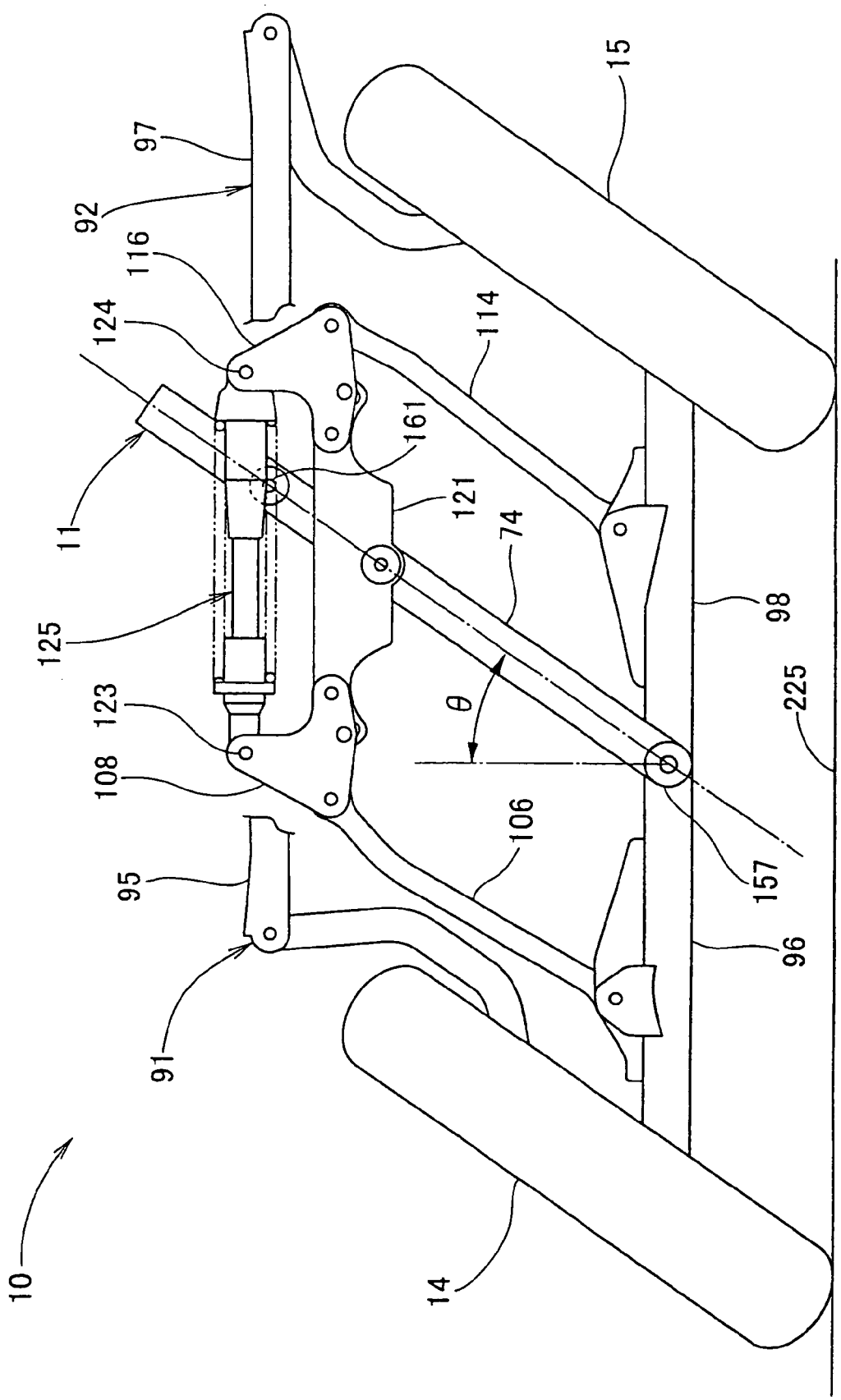
FIG. 10 is a second back elevation for showing a function of the swingable vehicle according to the present invention.

FIG. 10 is a second back elevation showing the function of the swingable vehicle according to the present invention.

For example, in the case where the vehicle body frame 11, specifically, the under frame 74 is swung by an angle θ to the right, the left upper arm 95 and the left lower arm 96 are moved in parallel, and the right upper arm 97 and the right lower arm 98 are moved in parallel. Therefore, the rear wheels 14 and 15 are both inclined by an angle θ to the right, that is, the camber angle of the rear wheels 14 and 15 becomes θ. Therefore, by swinging the swingable vehicle 10 to the turning side during turning, like in the case of a motorcycle, a force toward the inner side in the turning direction, i.e., a camber thrust is exerted on each of the rear wheels 14 and 15, which promises a smooth turning of the swingable vehicle 10.

Thus, even when the vehicle body frame 11 is swung relative to the leftside suspension arm 91 and the rightisde suspension arm 92, the left link 106 and the right link 114 are inclined in parallel, so that the interval between the support shaft 123 of the left bell crank 108 and the support shaft 124 of the right bell crank 116 is not varied and a shock-absorbing action by the shock absorber 125 is not developed. It should be noted here, however, that since the under frame 74 is inclined relative to the left-right connection member 121, such an elastic force so as to return the swung vehicle body frame 11 to the upright state is generated in the Neidhart damper 171, as has been described referring to FIGS. 3 and 5.

Figure 11A:
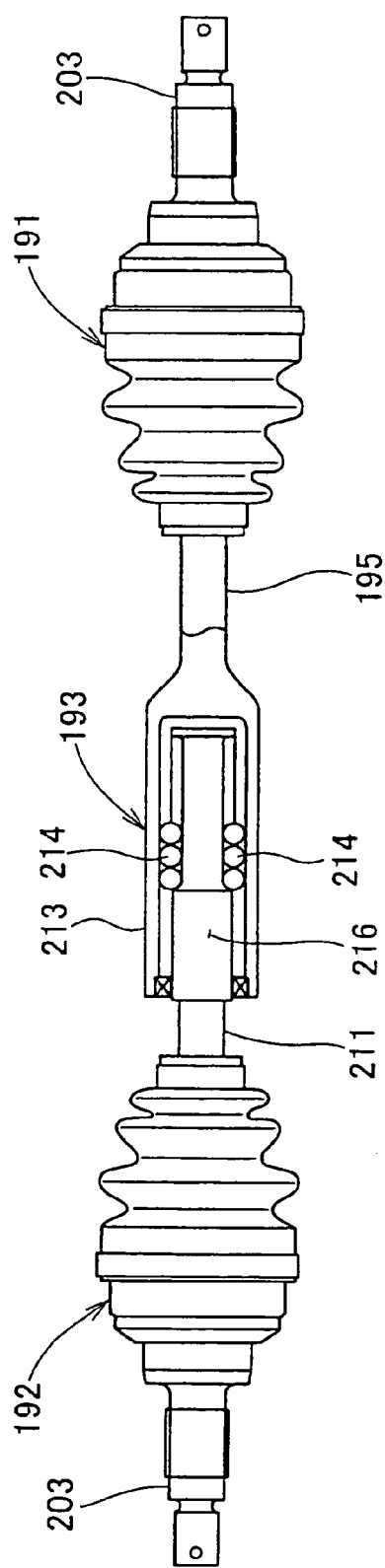
FIGS. 11(a) and 11(b) show diagrams for showing functions of the drive shaft in the swingable vehicle according to the present invention.
Figure 11B:
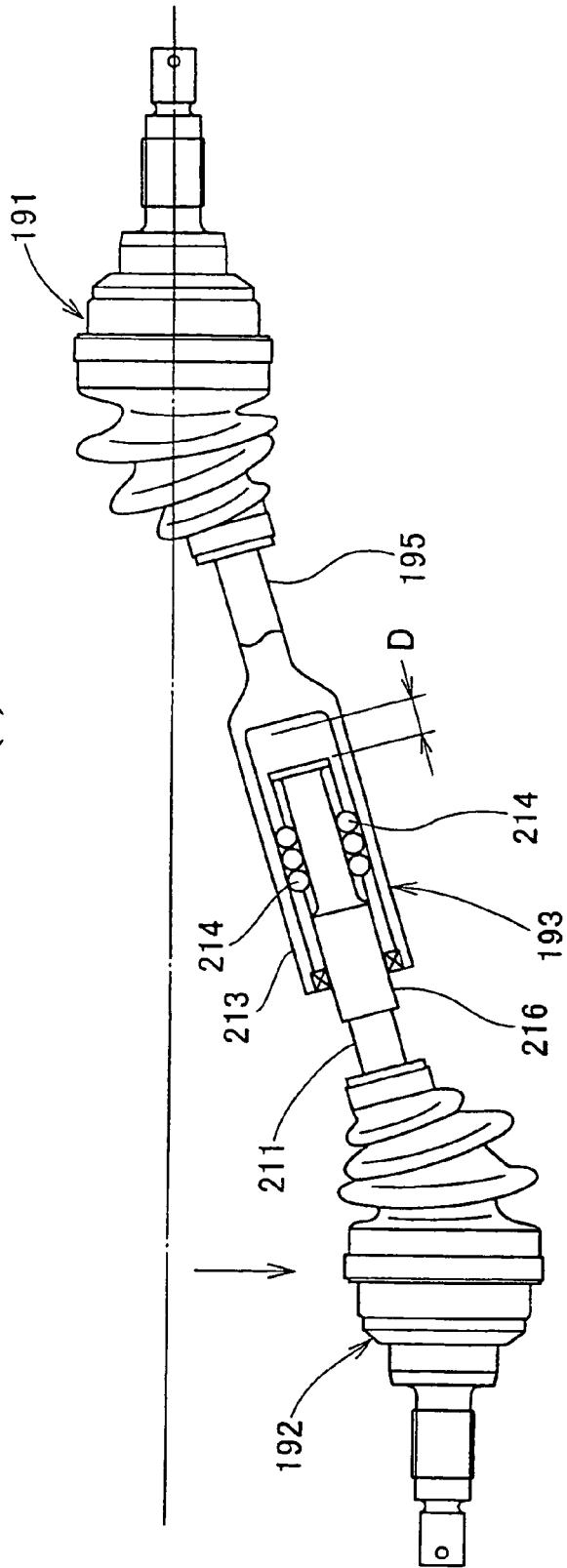

FIGS. 11(a) and (b) are diagrams for showing the functions of the drive shaft in the swingable vehicle according to the present invention.

FIG. 11(a) shows the condition where the inside constant velocity joint 191 and the outside constant velocity joint 192 are located on a straight line.

In FIG. 8(b), when the rear wheel is vertically moved relative to the gear box, the outside constant velocity joint 192 is moved in a direction perpendicular to the axial direction relative to the inside constant velocity joint 191 as indicated by the arrow, so that the slide shaft 216 is moved by a distance D out of the tubular portion 213 while the balls 214 . . . in the ball spline mechanism 193 roll.

As has been described above referring to FIGS. 1, 3, 7 and 8, the present invention is firstly characterized in that, in the three-wheel or four-wheel vehicle including the wheels driven through the drive shafts, the left drive shaft 143 and the right drive shaft 144 are each composed of the pair of inside constant velocity joint 191 and the outside constant velocity joint 192. The ball spline mechanism 193 provided between the inside constant velocity joint 191 and the outside constant velocity joint 192 enables the distance between the inside constant velocity joint 191 and the outside constant velocity joint 192 to be contracted and extended. The ball spline mechanism 193 is composed of the spline shaft 216 having an outer circumferential surface provided with the plurality of the axial grooves 222 as the shaft-side spline grooves extending in the axial direction with the tubular portion 213 surrounding the periphery of the spline shaft 216 and having an inner circumferential surface provided with the plurality of the axial grooves 221 as the tube-side spline grooves extending in the axial direction. The plurality of the balls 214 are capable of rolling while being fitted in the axial grooves 222 and the axial grooves 221.

Since the ball spline mechanism 193 is interposed between the pair of the inside constant velocity joint 191 and the outside constant velocity joint 192 in each of the left and right drive shafts 143 and 144, the bend angles of the inside constant velocity joint 191 and the outside constant velocity joint 192 can be made larger, as compared with the case where the constant velocity joints in the drive shafts are provided with a slide mechanism. Therefore, it is possible to shorten the overall length of the left and right drive shafts 143 and 144 while securing the vertical strokes of the rear wheels 14 and 15 and to reduce the tread between the rear wheels 14 and 15. Thus, it is possible to suppress an increase in the vehicle width and to achieve a reduction in the size of the swingable vehicle 10.

In addition, since the bend angles of the inside constant velocity joint 191 and the outside constant velocity joint 192 are large, it is possible to increase the degree of freedom in the design of the double wishbone type suspension 42.

Furthermore, when the pair of the inside constant velocity joint 191 and the outside constant velocity joint 192 are the same with each other and a commercially available ball spline mechanism 193 is utilized, it is possible to suppress an increase in the cost of the left and right drive shafts 143 and 144.

The present invention is secondly characterized in that the left and right drive shafts 143 and 144 are mounted to a swingable three-wheel vehicle in which the vehicle body frame 11 is swung in the left-right direction relative to the double wishbone type suspension 42 for supporting the rear wheels 14 and 15 as the wheels.

Since the left and right drive shafts 143 and 144 are mounted to the swingable three-wheel vehicle as the swingable vehicle 10 in which the vehicle body frame 11 is swung in the left-right direction relative to the double wishbone type suspension 42 for supporting the rear wheels 14 and 15 as the wheels, the bend angles of the left and right drive shafts 143 and 144 can be made large, so that it is possible to shorten the overall length of the left and right drive shafts 143 and 144 while securing the vertical strokes of the rear wheels 14 and 15 of the swingable three-wheel vehicle and hence to shorten the tread between the left and right rear wheels 14 and 15. Accordingly, by applying the left and right drive shafts 143 and 144 to a small-type swingable three-wheel vehicle, it is possible to reduce the vehicle width and to achieve a reduction in the size of the swingable three-wheel vehicle.

In addition, by the combination of the double wishbone type suspension 42 high in the degree of freedom in designing with the above-mentioned left and right drive shafts 143 and 144, it is possible to further enhance the ride comfort and operating performance of the swingable three-wheel vehicle.

The present invention is thirdly characterized in that the swingable three-wheel vehicle as the swingable vehicle 10 is a vehicle in which the engine 37 is rubber mounted on the vehicle body frame 11.

Since the swingable three-wheel vehicle is a vehicle in which the engine 37 is rubber mounted on the vehicle body frame 11, vibrations can be prevented from being transmitted from the engine 37 to the vehicle body frame 11, and displacements of the engine 37 can be absorbed by the left and right drive shafts 143 and 144.

Figure 12A:
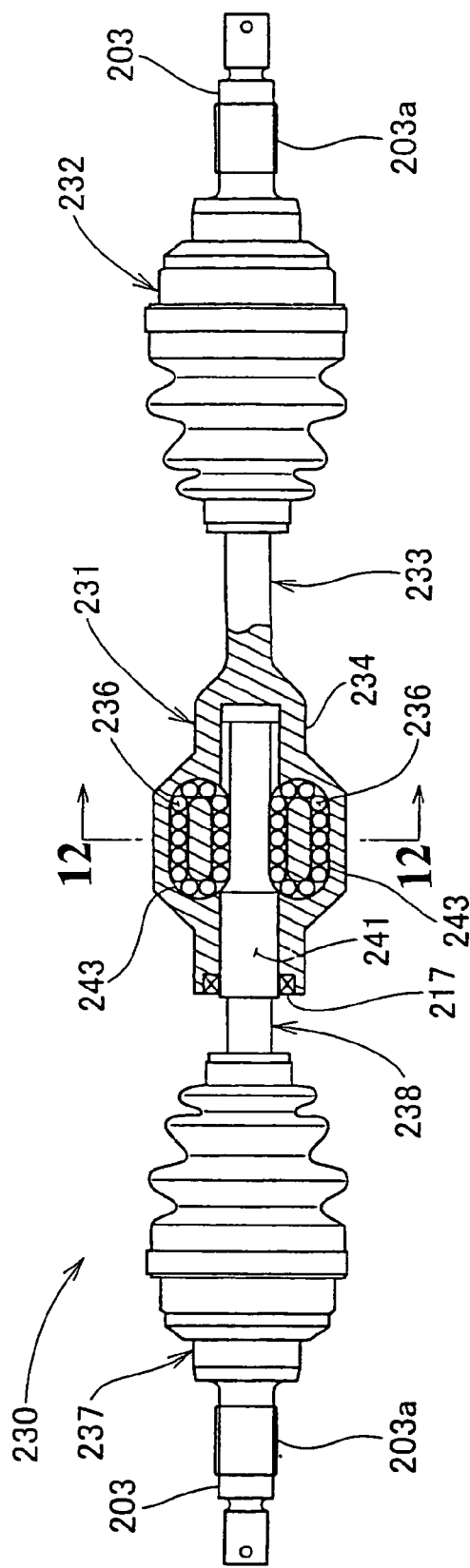
FIGS. 12(a) and 12(b) show sectional views of another embodiment of the drive shaft in the swingable vehicle according to the present invention.

FIGS. 12(a) and (b) are sectional views (partly side views) showing another embodiment of the drive shaft in the swingable vehicle according to the present invention. The same components as those in the embodiment shown in FIG. 8 are denoted by the same symbols as above, and detailed description thereof is omitted.

In FIG. 12(a), the left drive shaft 230 is composed of an inside constant velocity joint 232 connected to the side of the gear box 41 (see FIG. 7), an outside constant velocity joint 237 connected to the side of the rear wheel 14 (see FIG. 7), and a ball spline mechanism 231 interposed between the inside constant velocity joint 231 and the outside constant velocity joint 237.

The ball spline mechanism 231 includes a tubular portion 234 as an outer tube formed as one body with one end portion of an inside shaft 233 for constituting the inside constant velocity joint 232. A spline shaft 241 is formed as one body with one end portion of an outside shaft 238 for constituting the outside constant velocity joint 237 and which is axially movably inserted in the tubular portion 234 with balls 236 . . . therebetween. A seal member 217 is provided at an opening portion of the tubular portion 234 for sealing off between the tubular portion 234 and the spline shaft 241.

The tubular portion 234 includes orbital holes 243 . . . having a loop shape and opened on the side of the spline shaft 241, with balls 236 . . . aligned in series in each orbital hole 243. The balls 236 . . . on the opening side of each orbital hole 243 roll in contact with the spline shaft 241, whereby the balls 236 . . . are circulated in each orbital hole 243 and the spline shaft 241 is moved in the axial direction relative to the tubular portion 234.

Figure 12B:
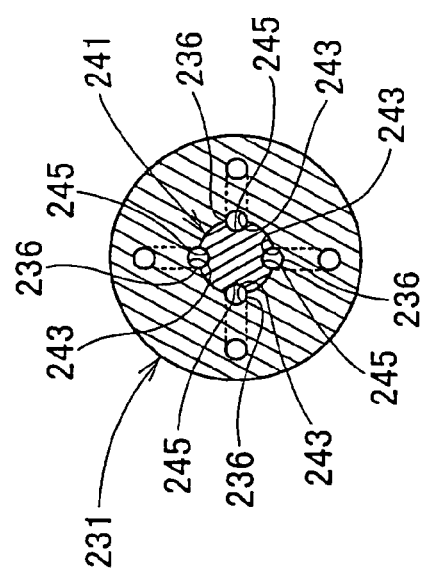

FIG. 12(b) is a sectional view along line 12-12 of FIG. 12(a). The ball spline mechanism 231 has a structure in which the outside surface of the spline shaft 241 is provided with axial grooves 245 . . . as shaft-side spline grooves in the axial direction for movement of the balls 236 . . . , and the balls 236 . . . making contact with the spline shaft 241 are each fitted in both the orbital hole 243 and the axial groove 245.

Accordingly, in FIGS. 12(a) and 12(b), the outside shaft 238 is slid in the axial direction relative to the inside shaft 233, without relative rotation, by the function of the ball spline mechanism 231.

Figure 13:
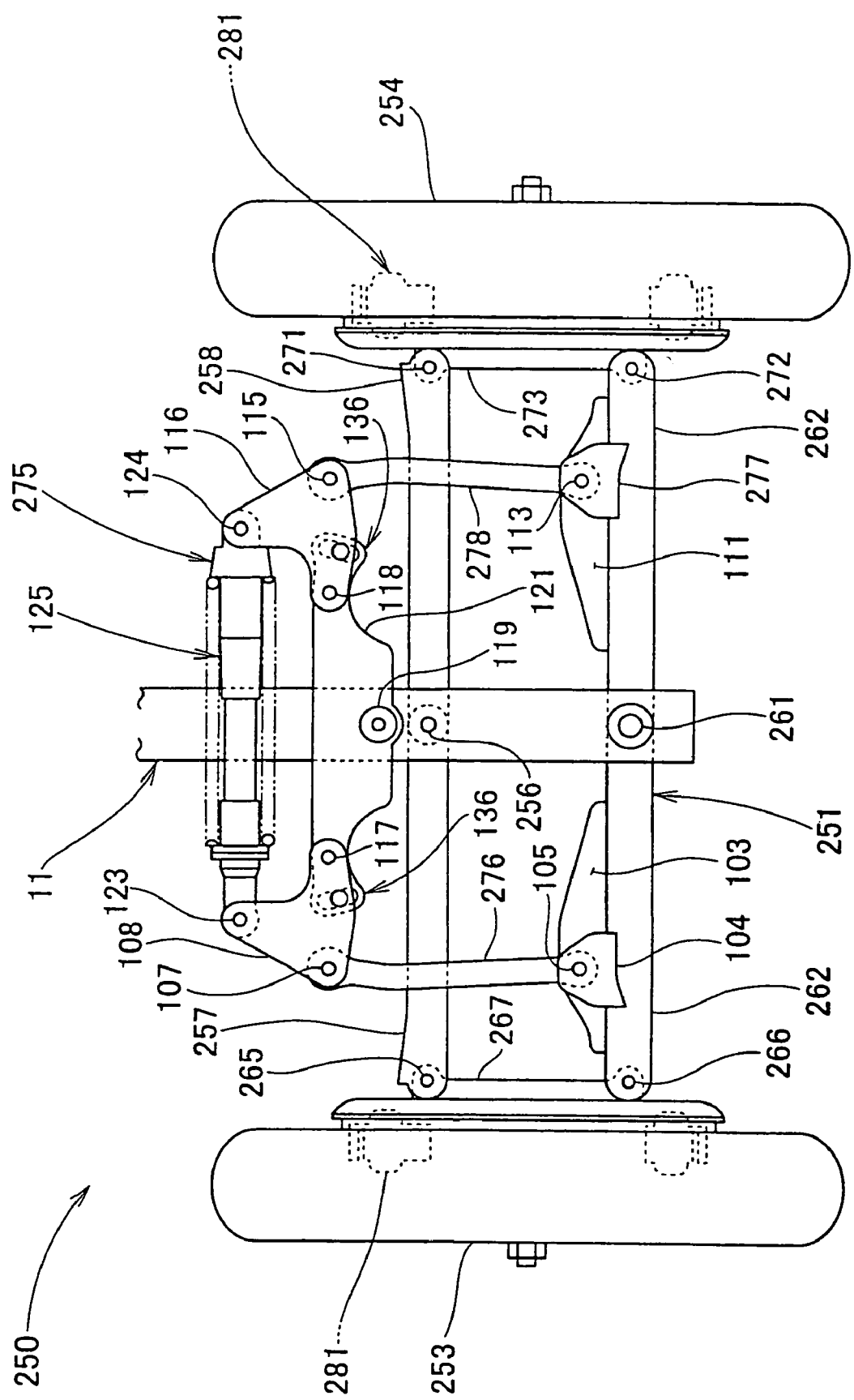
FIG. 13 is a back elevation of another embodiment of the swingable vehicle according to the present invention.

FIG. 13 is a back elevation showing another embodiment of the swingable vehicle according to the present invention. The same components as those in the embodiment shown in FIG. 3 are denoted by the same symbols as above, and detailed description thereof is omitted.

The swingable vehicle 250 has a structure in which electrically driven type drive wheels 253 and 254 are mounted to a vehicle body frame 11 through a double wishbone type suspension 251.

The double wishbone type suspension 251 has a structure in which a left upper arm 257 and a right upper arm 258 are swingably mounted to an upper support shaft 256 provided in the vehicle body frame 11. A left lower arm 262 and a right lower arm 263 are also swingably mounted to a lower support shaft 261 provided in the vehicle body frame 11. A left wheel base portion 267 is mounted to the respective tip ends of the left upper arm 257 and the left lower arm 262 through support shafts 265 and 266. A right wheel base portion 273 is mounted to the respective tip ends of the right upper arm 258 and the right lower arm 263 through support shafts 271 and 272.

In addition, a shock absorbing mechanism 275 for preventing shocks from being transmitted from the drive wheels 253 and 254 to the vehicle body frame 11 is annexed to the double wishbone type suspension 251.

The shock absorbing mechanism 275 is composed of a roughly rectilinear left ring 276 which is swingably mounted to left brackets 103 and 104 provided at upper portions of the left lower arm 262 which extends upwardly. A left bell crank 108 is swingably connected to the upper end of the left link 276 through a support shaft 107. A right link 278 is swingably mounted to right brackets 111 and 277 provided at upper portions of the right lower arm 263 through a support shaft 113 which extends upwardly. A right bell crank 116 is swingably mounted to the upper end of the right link 278 through a support shaft 115. A left-right connection member 121 is swingably mounted to a rear portion of the vehicle body frame 11 through a support shaft 119 for connecting the left bell crank 108 and the right bell crank 116 to each other through support shafts 117 and 118. A shock absorber 125 is bridgingly disposed between a support shaft 123 provided at the left bell crank 108 and a support shaft 124 provided at the right bell crank 116.

Figure 14:
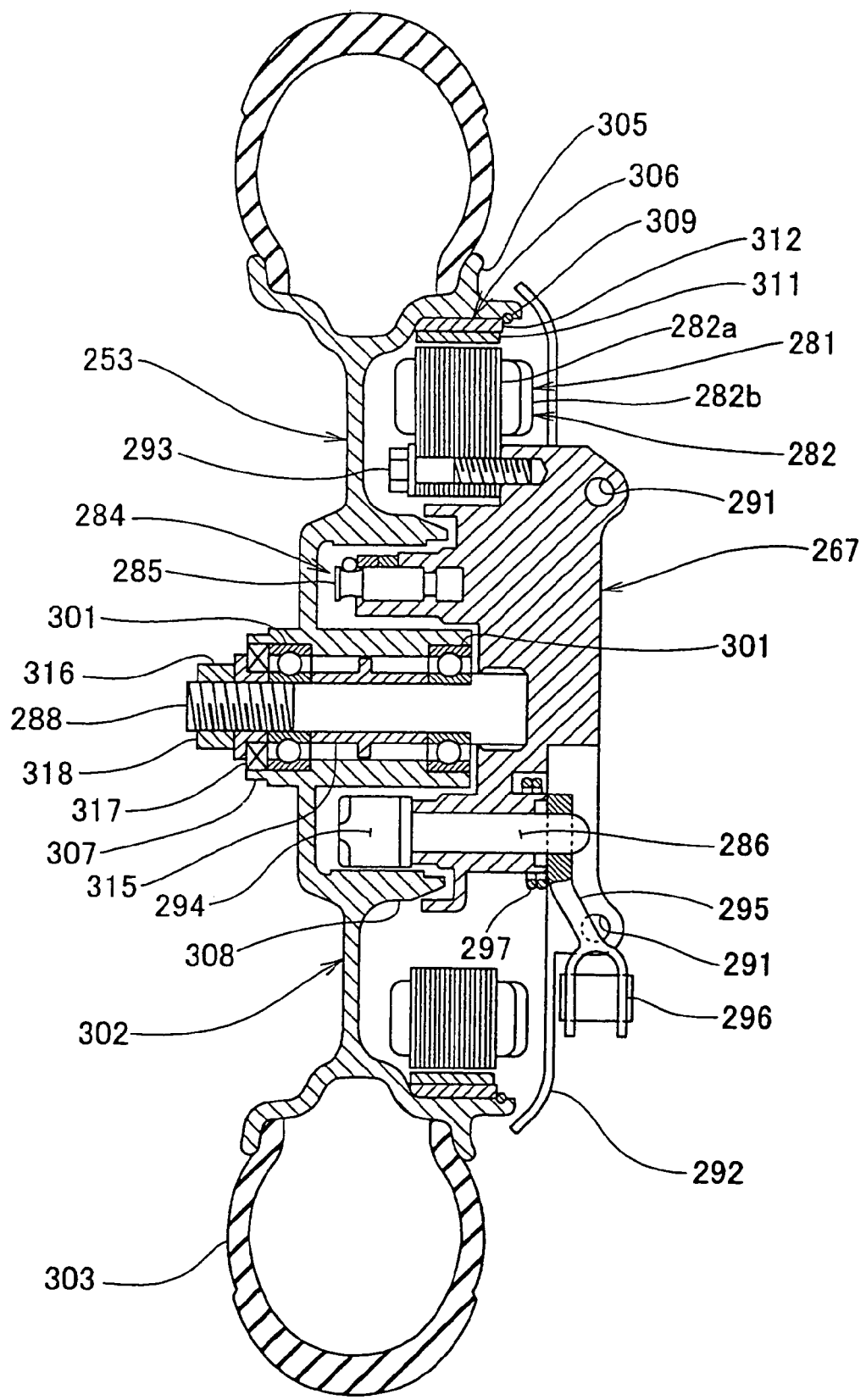
FIG. 14 is a sectional view showing a drive wheel mount portion in another embodiment of the swingable vehicle according to the present invention.
Figure 15:
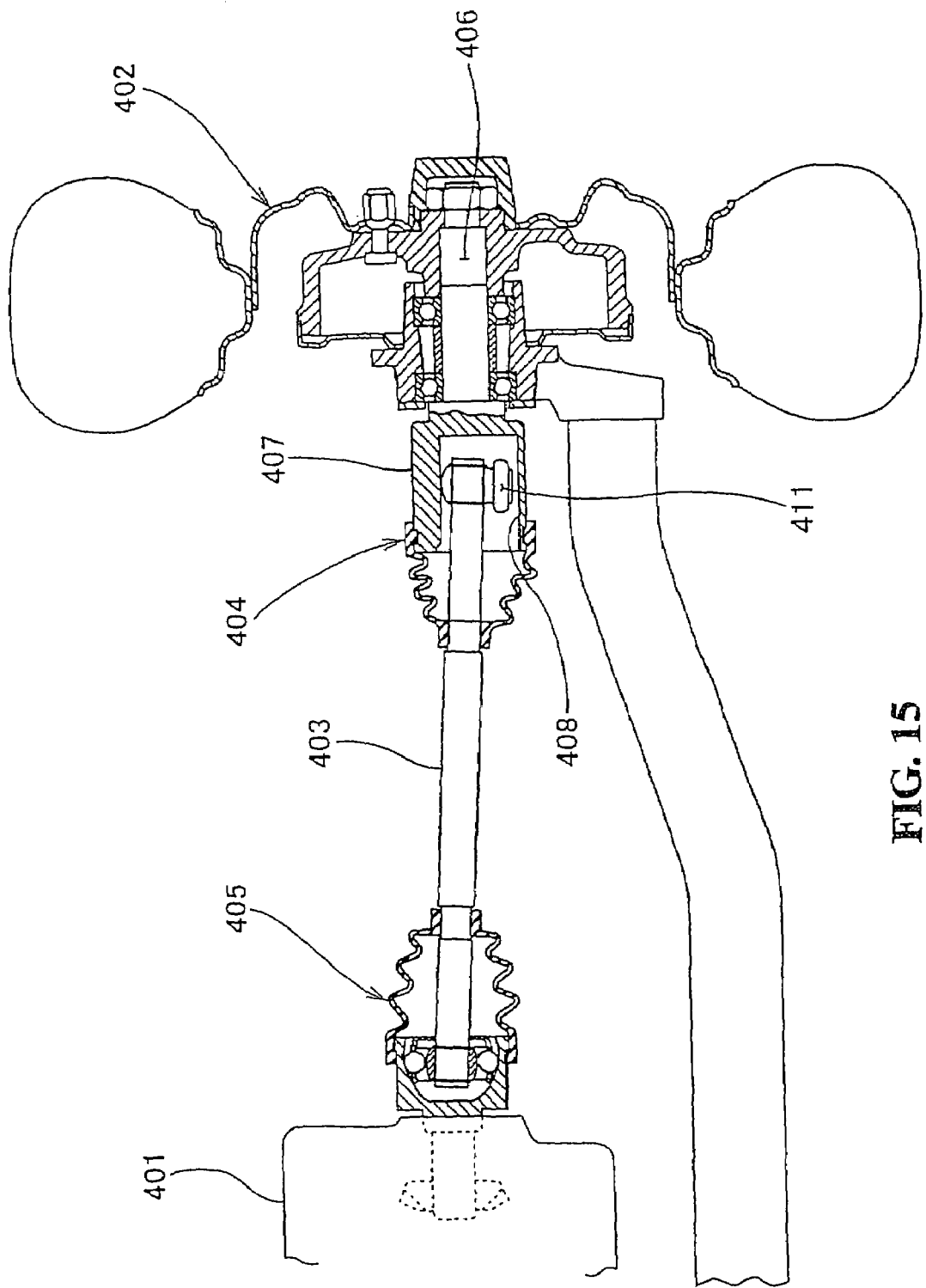
FIG. 15 is a sectional view of a drive shaft for a swingable vehicle according to the prior art.
Figure 16:
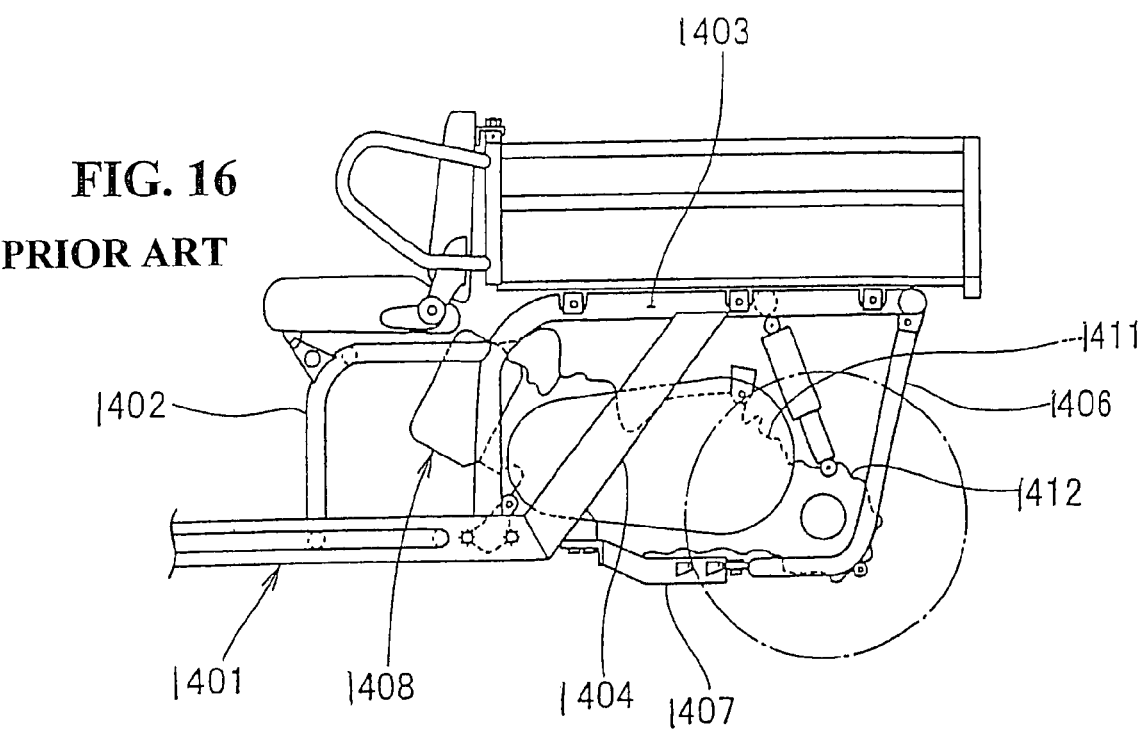
FIG. 16 is a side view showing the frame structure in the related art.
Figure 17:
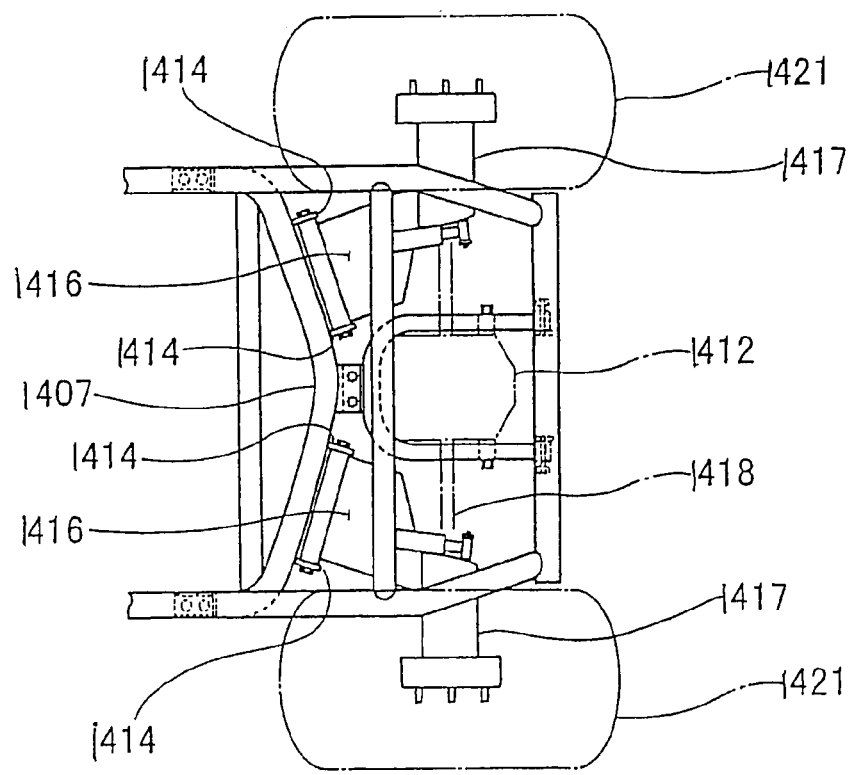
FIG. 17 is a plan view of the principal portion illustrated in FIG. 16 showing the frame structure of the vehicle in the related art.

FIG. 14 is a sectional view showing a drive wheel mount portion in another embodiment of the swingable vehicle according to the present invention wherein the drive wheel 253 is mounted to the left wheel base portion 267. The right wheel base portion 273 and the drive wheel 254 are the same as the left wheel base portion 267 and the drive wheel 253 in structure and a detailed description thereof is therefore omitted.

The left wheel base portion 267 is a member fitted with a stator 282 constituting an electric motor 281, a brake shoe support pin 285 and a brake shoe drive shaft 286 constituting a drum brake device 284 and an axle 288 for the drive wheel 253 includes a stud bolt. Mount holes 291, 291 are provided for mounting the left upper arm 257 (see FIG. 13) and the left lower arm 262 (see FIG. 13). A mud guard 292 is formed to be continuous in the circumferential direction.

The stator 282 is a component part attached to the left wheel base portion 267 by a plurality of bolts 293, and is composed of cores 282a . . . , and coils 282b . . . wound around the cores 282a . . . .

The brake shoe support pin 285 is a component part functioning as a swing shaft for two arcuate brake shoes (not shown).

The brake shoe drive shaft 286 is a component part provided with a cam 294 at one end thereof and fitted with a lever member 295 at the other end thereof. For example, when a brake lever or a brake pedal is operated, a rotating force is exerted on an end portion 296 of the lever member 295 through a wire and the force is transmitted through the brake shoe drive shaft 286 to rotate a cam 294, which moves the above-mentioned brake shoe in the radial direction and presses it against a brake drum (described later), thereby braking the drive wheel 253. Incidentally, symbol 297 denotes a return spring for generating an elastic force in the direction opposite to the direction of rotation of the brake shoe drive shaft 286 for braking, to thereby return the rotated brake shoe drive shaft 286 to its original rotational position.

The drive wheel 253 is composed of a wheel 302 rotatably mounted to the axle 288 through bearings 301, 301, and a tire 303 attached to the wheel 302. A rotor 306 constituting the electric motor 281 is mounted to the inside in the radial direction of a rim portion 305 of the wheel 302, and the brake drum 308 constituting the drum brake device 284 is formed on the radially outer side as one body with a hub portion 307 of the wheel 302. Incidentally, symbol 309 denotes a stop ring for fixing the rotor 306 to the wheel 302.

The rotor 306 is composed of permanent magnets 311 . . . , and a magnet holding portion 312 for holding the permanent magnets 311 . . . .

When electric power is supplied from a power source (not shown) to the coils 282b of the stator 282, the rotor 306 is rotated, whereby the drive wheel 253 is rotated.

A first collar 315 is fitted on the axle 288 for maintaining a fixed distance between the bearings 301, 301. A second collar 316 is fitted on the axle 288 for abutting one bearing 301 with a seal member 317 being provided between an end portion of the hub portion 307 and the second collar 316. A wheel nut 318 is screwed-engaged to the tip end of the axle 288 for mounting the drive wheel 253 to the axle 288.

The seal member 217 is used for the ball spline mechanism 193 as shown in FIG. 8 in the embodiment of the present invention, this structure is not limitative; the ball spline mechanism 193 may be sealed by fixing end portions of a rubber boot to the outside surface of the tubular portion 213 and to the outside shaft 211.

In addition, the swingable vehicle may be a swingable four-wheel vehicle in which left and right front wheels and left and right rear wheels are respectively supported by double wishbone type suspensions, for example. The present invention is suitable for swingable vehicles.

As described in FIGS. 1, 2, 4 and 5, according to the present invention, firstly, in a swinging vehicle 10, see FIG. 1, such as a three-wheel vehicle or a four-wheel vehicle in which left lower arm 96 and the right lower arm 98 are attached to the rear portion of a vehicle body frame 11 so as to be capable of swinging in the vertical direction, and rear wheels 14, 15 are connected via a left drive shaft 143 and a right drive shaft 144 from the engine 37 side and are rotatably mounted to the distal sides of the left lower arm 96 and the right lower arm 98. A vehicle frame structure includes an under frame 74 constituting the lower portion of the vehicle body frame 11 including a rising portion 151 inclining upwardly towards the rear in front of the rear wheels 14, 15, a fore-and-aft extending portion extending 152 substantially in the fore-and-aft direction above the rear wheels 14, 15 and a downwardly extending portion 153 extending downwardly behind the rear wheels 14, 15. The left lower arm 96 and the right lower arm 98 are formed into an A-shape and are supported by the lower part of the rising portion 151 and the lower end of the downwardly extending portion 153 via a supporting shaft 157.

Since the left lower arm 96 and the right lower arm 98 are formed into an A-shape and are supported by the lower portion of the rising portion 151 and the lower end of the downwardly extending portion 153 via the lower supporting shaft 157, the distances between the front and rear two mounting portions of the left lower arm 96 and the right lower arm 98 are formed into an A-shape with respect to the lower supporting shaft 157. More specifically, between the front mounting portion 96a and the rear mounting portion 96b and between the front mounting portion 98a and the rear mounting portion 98b the distances may be increased, respectively. Thus, variations in wheel alignment of the rear wheels 14, 15 may be controlled in a simple structure. Therefore, the frame may be downsized and the ground clearance is not limited by the rear frame.

Secondly, the present invention includes the rising portion 151, the fore-and-aft extending portion 152 and the downward extending portion 153 that are formed into the single under frame 74. The left lower arm 96 and the right lower arm 98 on the left and the right are supported by a single lower supporting shaft 157.

Since the left lower arm 96 and the right lower arm 98 on the left and the right are supported by the single lower supporting shaft 157, for example, in comparison with the case in which the suspensions are mounted separately to the left and right of the vehicle body frame, the tread between the left and right rear wheels 14, 15 may be reduced. Thus, the width of the vehicle may be reduced in the present invention. Also, since the left lower arm 96 and the right lower arm 98 on the left and the right are supported by the single lower supporting shaft 157, even when the width of the vehicle is small, for example, the double wishbone type suspension 42 having the left upper arm 95 and the left lower arm 96 and the right upper arm 97 and the right lower arm 98 on the left and the right as suspension arms and the right upper arm 97 and the right lower arm 98 may be employed as suspension arms. Thus, the ride quality may be improved even with the small swinging vehicle 10.

In addition, since the under frame 74 for supporting the left lower arm 96 and the right lower arm 98 is provided as a single frame, the structure of the vehicle body frame 11 is simplified. Thus, the frame may be downsized.

Although the rising portion, the fore-and-aft extending portion, and the lower extending portion are provided on the under frame and the suspension arms are supported at the lower part of the rising portion and the lower end of the downward extending portion in the embodiment of the present invention, it is not limited thereto. It is also possible to provide a front inclined portion inclining upwardly toward the rear and a rear inclining portion inclining from the rear end of the front inclining portion downwardly toward the rear at the rear of the under frame and support the suspension arm with the front lower portion of the front inclining portion and the rear lower portion of the rear inclining portion.

The frame structure for a vehicle according to the present invention is suitable for a three-wheel vehicle and a four-wheel vehicle.

Figure 18:
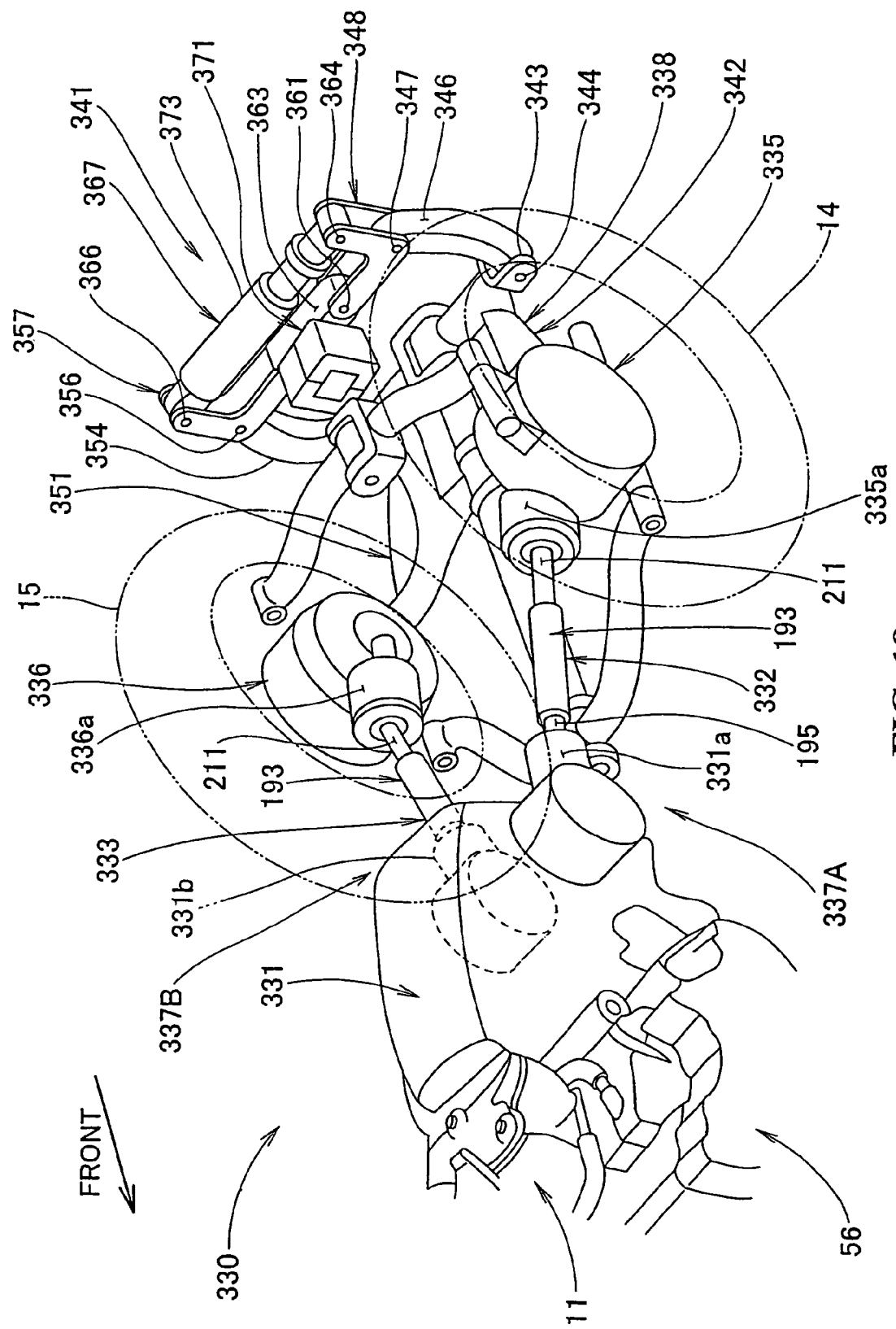
FIG. 18 is a perspective view of an essential part showing another embodiment of the swingable vehicle according to the present invention.

FIG. 18 is a perspective view of an essential part showing another embodiment of the swingable vehicle according to the present invention. The same components as those in the embodiment shown in FIGS. 1 to 10 are denoted by the same symbols as above, and detailed description thereof is omitted.

The swingable vehicle 330 is a swingable three-wheel vehicle in which a gear box 331 is connected to a rear portion of a non-stage transmission 56. A drive shaft 332 and a drive shaft 333 extend rearwardly, respectively, from left and right portions of a rear end portion of the gear box 331. The respective rear ends of the drive shaft 332 and the drive shaft 333 are connected to rear gear boxes 335 and 336. Axles (not shown) project, respectively, to the lateral sides of the vehicle body from the rear gear boxes 335 and 336 and are connected to rear wheels 14 and 15. Thus, the rear wheels 14 and 15 are driven by power supplied from an engine 37 (see FIG. 1) as a drive source.

The gear box 331 includes, at its lower end portion, a left constant velocity joint portion 331a and a right constant velocity joint portion 331b each incorporating a constant velocity joint therein. The rear gear boxes 335 and 336 include a left constant velocity joint portion 335a and a right constant velocity joint portion 336a each incorporating a constant velocity joint therein.

The drive shaft 332 includes a ball spline mechanism 193, an inside shaft 195 is connected to the left constant velocity joint portion 331a and an outside shaft 211 is connected to the left constant velocity joint portion 335a.

The drive shaft 333 includes a ball spline mechanism 193, an inside shaft 195 (not shown) is connected to the right constant velocity joint portion 331b, and an outside shaft 211 is connected to the right constant velocity joint portion 336a.

The left constant velocity joint portion 331a, the drive shaft 322 and the left constant velocity joint portion 335a constitute a left power transmission portion 337A, corresponding to the left drive shaft 143 shown in FIG. 7.

In addition, the right constant velocity joint portion 331b, the drive shaft 333 and the right constant velocity joint portion 336a constitute a right power transmission portion 337B.

The rear gear boxes 335 and 336 are for transmitting the power from the shaft in the front-rear direction of the vehicle to shafts in the vehicle width direction (namely, axles) through a pair of bevel gears and are supported by a double wishbone type suspension 338 (described in detail later) mounted to a vehicle body frame 11. See FIG. 1.

A shock absorbing mechanism 341 is annexed to the double wishbone type suspension 338 and includes a left link 346 which is swingably mounted to a left connection portion 343 provided at a left lower arm 342 constituting the double wishbone type suspension 338 through a support shaft 344 and which extends upwardly. A left bell crank 348 is swingably connected to the upper end of the left link 346 through a support shaft 347. A right link 354 is swingably mounted to a right connection portion 352 (not shown; the shape is the same as the roughly angular U-shape of the left connection portion 343) provided at a right lower arm 351 constituting the double wishbone type suspension 338 and which is extends upwardly. A right bell crank 357 is swingably connected to the upper end of the right link 354 through a support shaft 356. A left-right connection member 363 is swingably mounted to a rear portion of a vehicle body frame 11 through a support shaft 119, see FIG. 5, for connecting the left bell crank 348 and the right bell crank 357 to each other through support shafts 361 and 362 (not shown). A shock absorber 367 is bridgingly disposed between a support shaft 364 provided at the left bell crank 348 and a support shaft 366 provided at the right bell crank 357. A bisected Neidhart damper case 371 is provided.

The shock absorber 367 displays a shock-absorbing action when the rear wheels 14 and 15 are moved vertically. The shock absorber 367 is composed of a coil spring (not shown) for generating an elastic force and a damper 373 for generating an attenuating force.

Figure 19:
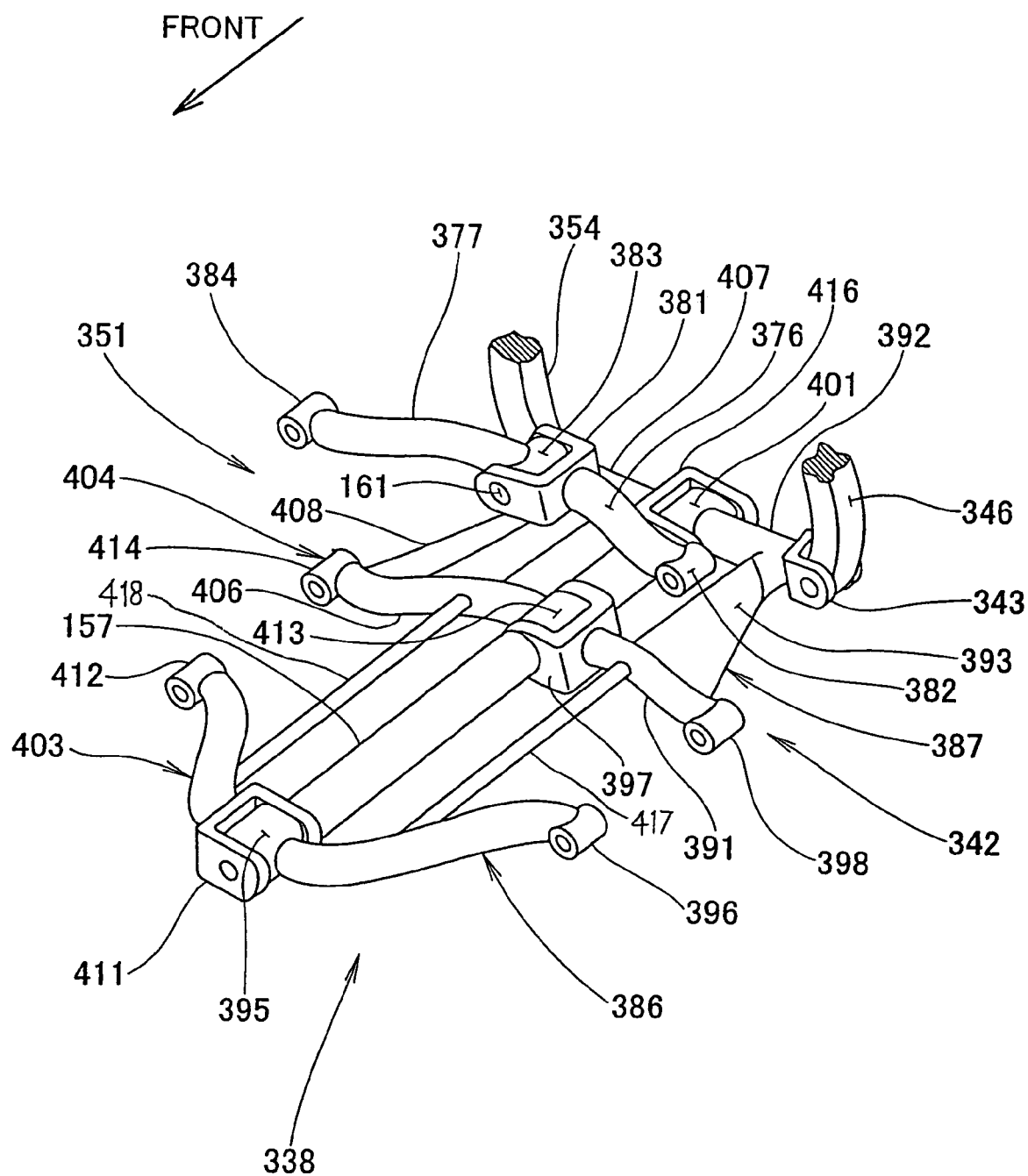
FIG. 19 is a perspective view of the rear wheel suspension of another embodiment of the swingable vehicle according to the present invention.
Figure 20A:
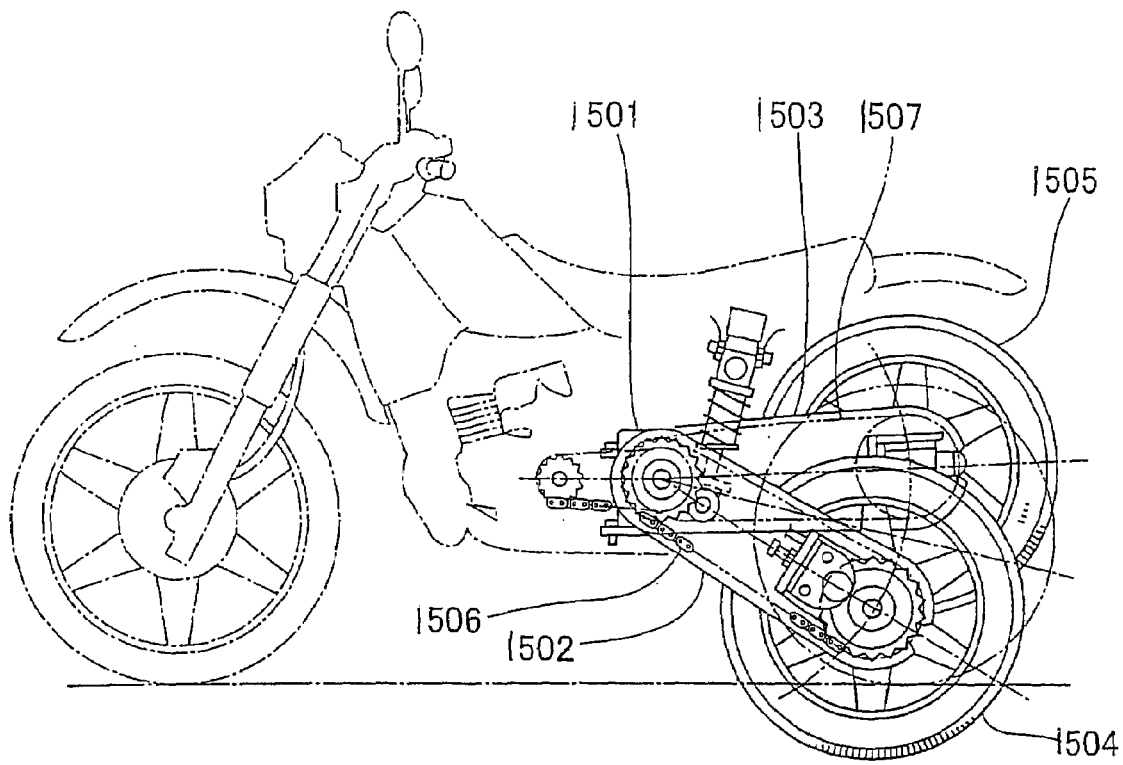
FIGS. 20(a) to 20(c) are illustrations of a conventional swingable vehicle.
Figure 20B:
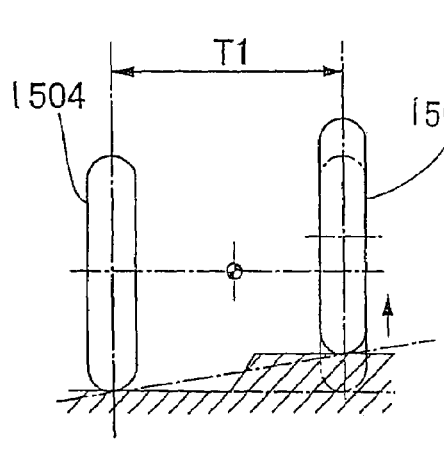
Figure 20C:
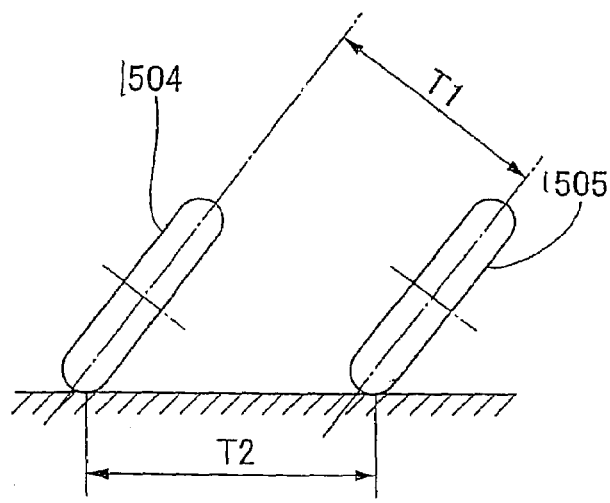

FIG. 19 is a perspective view of a rear wheel suspension in another embodiment of the swingable vehicle according to the present invention. The double wishbone type suspension 338 has a structure in which a left upper arm 376 and a right upper arm 377 are vertically swingably mounted to an upper support shaft 161 with the left lower arm 342 and the right lower arm 351 being vertically swingably mounted to a lower support shaft 157.

The left upper arm 376 is a member which is mounted to the upper support shaft 161 through a roughly angular U-shaped mount portion 381 and which is swingably mounted to a rear gear box 335, FIG. 18, through a tubular mount portion 382. The right upper arm 377 is a member which is mounted to the upper support shaft 161 on the inside of the roughly angular U-shaped mount portion 381 through a tubular mount portion 383 and which is swingably mounted to a rear gear box 336, FIG. 18, through a tubular mount portion 384.

The left lower arm 342 is composed of a front-side left arm 386 and a roughly H-shaped rear-side left arm 387 provided on the rear side of the front-side left arm 386.

The rear-side left arm 387 is composed of a first arm 391, a second arm 392 provided on the rear side of the first arm 391, and a connection portion 393 for connecting the first arm 391 and the second arm 392 to each other in a front-rear relationship. The second arm 392 is a member provided at the tip end of the above-mentioned left connection arm 343, whereby it is connected to the left link 346.

A tubular mount portion 395 is provided for mounting the front-side left arm 386 to the lower support shaft 157. A tubular mount portion 396 is provided for mounting the front-side left arm 386 to the rear gear box 335. A roughly angular U-shaped mount portion 397 is provided for mounting the first arm 391 to the lower support shaft 157. A tubular mount portion 398 is provided for swingably mounting the first arm 391 to the rear gear box 335. A tubular mount portion 401 is provided for mounting the second arm 392 to the lower support arm 157.

The right lower arm 351 includes a front-side right arm 403 and a roughly H-shaped rear-side right arm 404 provided on the rear side of the front-side right arm 403.

The rear-side right arm 404 is composed of a first arm 406, a second arm 407 provided on the rear side of the first arm 406 and a connection portion 408 for connecting the first arm 406 and the second arm 407 in a front-rear relationship. The second arm 407 is a member which is provided at the tip end of the above-mentioned right connection portion 352, whereby it is connected to the right link 354.

A roughly angular U-shaped mount portion 411 is provided for mounting the front-side right arm 403 to the lower support shaft 157. A tubular mount portion 412 is provided for mounting the front-side right arm 403 to the rear gear box 336. A tubular mount portion 413 is provided for mounting the first arm 406 to the lower support shaft 157 on the inner side of the roughly angular U-shaped mount portion 397. A tubular mount portion 414 is provided for swingably mounting the first arm 406 to the rear gear box 336. A roughly angular U-shaped mount portion 416 is provided for mounting the second arm 407 to the lower support shaft 157. A connecting rod 417 is provided for connecting the front-side left arm 396 and the first arm 391 to each other. A connecting rod 418 is provided for connecting the front-side right arm 403 and the first arm 406 to each other.

As has been described above referring to FIGS. 18 and 19, the present invention is firstly characterized in that, in the swingable vehicle 330 in the form of a three-wheel vehicle, a four-wheel vehicle or the like including the left and right suspension arms 95 to 98 mounted to the vehicle body 11, the vehicle body frame 11 is swingable in the left-right direction relative to the suspension arms 95 to 98. The suspension arms 95 to 98 are provided at left and right positions and at upper and lower positions to constitute a double wishbone type suspension 338. The left and right rear wheels 14 and 15 are supported by the double wishbone type suspension 338. The rear wheels 14 and 15 are connected to the engine 37, see FIG. 1, as the drive source side through the left power transmission portion 337A and the right power transmission portion 337B as the drive shafts extend in the front-rear direction.

By providing the double wishbone type suspension 338, it is possible to reduce variations in the tread between the left and right rear wheels 14 and 15, and to enhance the operability and safety of the swingable vehicle 330. In addition, with the left power transmission portion 337A and the right power transmission portion 337B extending in the front-rear direction from the side of the engine 37 to the rear wheels 14 and 15, it is possible to enlarge the overall length of the left transmission portion 337A and the right power transmission portion 337B while securing bend angles of constant velocity joints in the left power transmission portion 337A and the right power transmission portion 337B without enlarging the tread of the rear wheels 14 and 15, to enlarge the vertical strokes of the rear wheels 14 and 15 and to enhance the uneven ground operational performance of the swingable vehicle 330. Furthermore, since the left power transmission portion 337A and the right power transmission portion 337B are used, there is no need for adjustment, replacement or the like, and it is possible to enhance maintainability.

The present invention is secondly characterized in that the left and right suspension arms 95 to 98 are swingably mounted to one upper support shaft 161 and one lower support shaft 157 provided at central portions of the vehicle body.

With the left and right suspension arms 95 to 98 being respectively mounted to one upper support shaft 161 and one lower support shaft 157, it is possible to reduce the tread between the left and right rear wheels 14 and 15 and reduce the vehicle width, as compared, for example, with the case where the left and right suspension arms are respectively mounted to different shafts. Therefore, it is possible to contrive a reduction in the size of the swingable vehicle 330.

Incidentally, the left power transmission portion 337A and the right power transmission portion 337B shown in FIG. 19 may be replaced by the left drive shaft 143 and the right drive shaft 144 shown in FIG. 8.

The swingable vehicle according to the present invention is suitable for three-wheel and four-wheel vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A three-wheel swingable vehicle comprising:
   wheels driven through drive shafts;
   a pair of constant velocity joints operatively connected to each of said drive shafts;
   a ball spline mechanism provided between said constant velocity joints for enabling the distance between said constant velocity joints to be contracted and extended; and
   said ball spline mechanism includes a spline shaft having an outer circumferential surface provided with a plurality of shaft-side spline grooves extending in the axial direction, an outer tube surrounding the periphery of said spline shaft and having an inner circumferential surface provided with a plurality of tube-side spline grooves extending in the axial direction and a plurality of balls capable of rolling while being fitted in said shaft-side spline grooves and said tube-side spline grooves,
   wherein said drive shafts are mounted to a swingable three-wheel vehicle in which a vehicle body frame is swung in a left-right direction relative to a double wishbone type suspension for supporting rear wheels as said wheels.

2. The swingable vehicle according to claim 1, wherein said swingable three-wheel vehicle is a vehicle in which an engine is rubber mounted on said vehicle body frame.

3. The swingable vehicle as set forth in claim 1, wherein said outer tube extends a predetermined distance and said spline shaft extends a predetermined distance within said outer tube for enabling said spline shaft to axially move a predetermined distance relative to said outer tube.

4. The swingable vehicle as set forth in claim 3, wherein said plurality of balls enable the spline shaft to axially slide relative to the outer tube.

5. The swingable vehicle as set forth in claim 1, and further including a seal member for sealing an opening between said outer tube and said spline shaft.

6. The swingable vehicle as set forth in claim 1, wherein when a wheel connected to the drive shaft is moved in a vertical direction, the spline shaft is moved a predetermined distance relative to said outer tube for maintaining an operative drive connection to said wheel.

7. The swingable vehicle as set forth in claim 1, wherein the outer tube includes an orbital hole having a loop shape being opened on a side of the spline shaft and said plurality of balls being circulated within said orbital hole and the spline shaft permitting limited axial movement between said outer tube and said spline shaft.

8. In a three-wheel vehicle in which left and right suspension arms are attached to a rear portion of a vehicle body frame so as to be capable of swinging in a vertical direction, and driving wheels connected via a drive shaft are rotatably mounted to distal ends of the suspension arms comprising:
   a vehicle frame structure including an under frame constituting a lower portion of the vehicle body frame with a rising portion inclining upwardly towards a rear in front of the drive shaft; a fore-and-aft extending portion extending substantially in a fore-and-aft direction above the drive shaft; and a downwardly extending portion extending downwardly behind the drive shaft;
   wherein said suspension arms are formed into an A-shape and are supported by a lower part of the rising portion and a lower end of the downwardly extending portion via a supporting shaft, and
   wherein the rising portion, the fore-and-aft extending portion, and the downwardly extending portion are formed into a single frame, and the left and right suspension arms are supported via a single supporting shaft.

9. The vehicle frame structure according to claim 8, wherein by supporting the left and right suspension arms via a single supporting shaft, a tread between left and right driving wheels is reduced.

10. The vehicle frame structure according to claim 8, wherein by supporting the left and right suspension arms via a single supporting shaft, a width of the vehicle is reduced.

11. The vehicle frame structure according to claim 8, wherein a distance between a front mounting portion and a rear mounting portion of a left suspension arm and a front mounting portion and a rear mounting portion of a right suspension arm is increased for controlling variations in wheel alignment and downsizing the vehicle frame.

12. A three-wheel swingable vehicle comprising:
    wheels driven through drive shafts;
    a pair of constant velocity joints operatively connected to each of said drive shafts;
    a ball spline mechanism provided between said constant velocity joints for enabling the distance between said constant velocity joints to be contracted and extended; and
    said ball spline mechanism includes a spline shaft having an outer circumferential surface provided with a plurality of shaft-side spline grooves extending in the axial direction, an outer tube surrounding the periphery of said spline shaft and having an inner circumferential surface provided with a plurality of tube-side spline grooves extending in the axial direction and a plurality of balls capable of rolling while being fitted in said shaft-side spline grooves and said tube-side spline grooves,
    wherein said drive shafts are mounted to a swingable three-wheel vehicle in which a vehicle body frame is swung in a left-right direction relative to a double wishbone type suspension for supporting rear wheels as said wheels,
    the vehicle further comprising:
    left and right suspension arms mounted to a vehicle body frame, said vehicle body frame being swingable in the left-right direction relative to said suspension arms;
    wherein said suspension arms are provided at left and right positions and at upper and lower positions to constitute a double wishbone type suspension, left and right drive wheels are supported by said double wishbone type suspension and said drive wheels are connected to a drive source side through drive shafts extending in a front-rear direction.

13. The swingable vehicle according to claim 12, wherein said left and right suspension arms are swingably mounted to one upper support shaft and one lower support shaft which are provided at central portions of the vehicle body frame.

14. The swingable vehicle according to claim 13, wherein said left suspension arm is mounted to the one upper support shaft by an angular U-shaped mounting portion that is swingably mounted to a rear gear box.

15. The swingable vehicle according to claim 14, wherein said right suspension arm is mounted to said upper support shaft on an inside portion of said angular U-shaped mounting portion through a tubular mount portion that is swingably mounted to a second rear gear box.

16. The swingable vehicle according to claim 12, wherein a rear side left suspension arm includes a first arm and a second arm with a connection portion for connecting the first arm and the second arm in a front-rear relationship.

* * * * *